(12) United States Patent
Huang

(10) Patent No.: US 10,338,351 B2
(45) Date of Patent: Jul. 2, 2019

(54) IMAGE LENS ASSEMBLY AND IMAGE CAPTURING DEVICE

(71) Applicant: LARGAN PRECISION CO., LTD., Taichung (TW)

(72) Inventor: Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/012,752

(22) Filed: Jun. 19, 2018

(65) Prior Publication Data

US 2018/0299650 A1 Oct. 18, 2018

Related U.S. Application Data

(63) Continuation of application No. 15/287,759, filed on Oct. 7, 2016, now Pat. No. 10,025,070, which is a
(Continued)

(30) Foreign Application Priority Data

Jul. 25, 2013 (TW) .............................. 102126700 A

(51) Int. Cl.
*G02B 13/18* (2006.01)
*G02B 13/00* (2006.01)
(Continued)

(52) U.S. Cl.
CPC ........... *G02B 13/0045* (2013.01); *G02B 3/04* (2013.01); *G02B 9/62* (2013.01); *G02B 13/002* (2013.01);
(Continued)

(58) Field of Classification Search
CPC ...... G02B 13/0045; G02B 9/62; G02B 13/18; G02B 13/002; G02B 3/04; G02B 27/0025;
(Continued)

(56) References Cited

U.S. PATENT DOCUMENTS 5,475,536 A 12/1995 Kikutani
5,600,489 A 2/1997 Ueda et al.
(Continued)

FOREIGN PATENT DOCUMENTS

CN 101408664 A 4/2009
CN 102841432 A 12/2012
(Continued)

*Primary Examiner* — Evelyn A Lester
(74) *Attorney, Agent, or Firm* — CKC & Partners Co., LLC

(57) ABSTRACT

An image lens assembly includes, in order from an object side to an image side, a first lens element, a second lens element, a third lens element, a fourth lens element, a fifth lens element and a sixth lens element. The first lens element with positive refractive power has a convex object-side surface. The second lens element has positive refractive power. The third lens element has refractive power. The fourth lens element has refractive power. The fifth lens element with negative refractive power has a concave object-side surface, wherein both of the surfaces of the fifth lens element are aspheric. The sixth lens element with refractive power has a concave image-side surface, wherein the image-side surface thereof has at least one inflection point, and both of the surfaces of the sixth lens element are aspheric. The image lens assembly has a total of six lens elements with refractive power.

30 Claims, 20 Drawing Sheets

Related U.S. Application Data continuation of application No. 14/979,548, filed on Dec. 28, 2015, now Pat. No. 9,488,809, which is a continuation of application No. 14/676,799, filed on Apr. 1, 2015, now Pat. No. 9,256,054, which is a continuation of application No. 13/956,389, filed on Aug. 1, 2013, now Pat. No. 9,036,272.

(51) Int. Cl.

| | | |
|---|---|---|
| G02B 9/62 | (2006.01) | |
| G02B 3/04 | (2006.01) | |
| H04N 5/225 | (2006.01) | |
| H04N 5/335 | (2011.01) | |
| G02B 27/00 | (2006.01) | |
| G02B 5/00 | (2006.01) | |
| G02B 5/20 | (2006.01) | |

(52) U.S. Cl.
CPC ......... *G02B 13/18* (2013.01); *G02B 27/0025* (2013.01); *H04N 5/2254* (2013.01); *H04N 5/335* (2013.01); *G02B 5/005* (2013.01); *G02B 5/208* (2013.01)

(58) Field of Classification Search
CPC ...... G02B 5/005; G02B 5/208; H04N 5/2254; H04N 5/335
USPC .................................. 359/713, 740, 757, 759
See application file for complete search history.

(56) References Cited

U.S. PATENT DOCUMENTS

| | | |
|---|---|---|
| 5,663,836 A | 9/1997 | Ogata |
| 5,691,850 A | 11/1997 | Arisaka |
| 5,936,775 A | 8/1999 | Abe |
| 8,335,043 B2 | 12/2012 | Huang |
| 8,385,006 B2 | 2/2013 | Tsai et al. |
| 8,477,431 B2 | 7/2013 | Huang |
| 8,724,237 B2 | 5/2014 | Hsu et al. |
| 8,743,483 B2 | 6/2014 | Hsu et al. |
| 8,854,745 B1 | 10/2014 | Chen |
| 9,036,272 B2 | 5/2015 | Huang |
| 9,256,054 B2 | 2/2016 | Huang |
| 9,488,809 B2 | 11/2016 | Huang |
| 10,025,070 B2 * | 7/2018 | Huang .................... G02B 3/04 |
| 2012/0057249 A1 | 3/2012 | Yamamoto |
| 2012/0314301 A1 | 12/2012 | Huang et al. |
| 2012/0314304 A1 | 12/2012 | Huang |
| 2014/0078603 A1 | 3/2014 | You |
| 2014/0192422 A1 | 7/2014 | Tang et al. |
| 2014/0376107 A1 | 12/2014 | Son |
| 2015/0022905 A1 | 1/2015 | Shinohara |
| 2015/0124332 A1 | 5/2015 | Noda et al. |
| 2015/0124333 A1 | 5/2015 | Noda |
| 2016/0054543 A1 | 2/2016 | Nabeta |

FOREIGN PATENT DOCUMENTS

| | | |
|---|---|---|
| CN | 203981955 U | 12/2014 |
| CN | 204422844 U | 6/2015 |
| JP | H0451108 A | 2/1992 |
| JP | H05346542 A | 12/1993 |
| JP | H0727976 A | 1/1995 |
| JP | H1172720 A | 3/1999 |
| JP | 2009204997 A | 9/2009 |
| JP | 2011085733 A | 4/2011 |
| JP | 2012058315 A | 3/2012 |
| JP | 2014059561 A1 | 4/2014 |
| WO | 2011118554 A1 | 9/2011 |
| WO | 2014162779 A1 | 10/2014 |

* cited by examiner

IMAGE LENS ASSEMBLY AND IMAGE CAPTURING DEVICE

RELATED APPLICATIONS

This application is a continuation of U.S. application Ser. No. 15/287,759, filed on Oct. 7, 2016, U.S. Pat. No. 10,025,070 B2, issued on Jul. 17, 2018, which is a continuation of U.S. application Ser. No. 14/979,548, filed on Dec. 28, 2015, now U.S. Pat. No. 9,488,809 issued on Nov. 8, 2016, which is a continuation of U.S. application Ser. No. 14/676,799, filed on Apr. 1, 2015, now U.S. Pat. No. 9,256,054 issued on Feb. 9, 2016, which is a continuation of U.S. application Ser. No. 13/956,389, filed on Aug. 1, 2013, now U.S. Pat. No. 9,036,272 issued on May 19, 2015, which claims priority under 35 U.S.C. 119(e) to Taiwan Application Serial Number 102126700, filed on Jul. 25, 2013, all of which are herein incorporated by reference.

BACKGROUND

Technical Field

The present disclosure relates to an image lens assembly. More particularly, the present disclosure relates to a miniaturized image lens assembly applicable to the electronic products.

Description of Related Art

In recent years, with the popularity of mobile products having camera functionalities, a demand for optical system has been increasing. A photosensitive sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and the optical systems have gradually evolved toward a field of higher megapixels, there is an increasing demand for better image quality.

A conventional optical system employed in a portable electronic product, mainly adopts a structure of four lens elements or of five lens elements. Due to the popularity of mobile products with high-end specifications, such as smart phones and PDAs (Personal Digital Assistants), requirements of higher megapixels and better image quality have been increasing rapidly. However, the conventional optical systems cannot satisfy the requirements of high-end optical systems with camera functionalities.

Other conventional compact optical systems with six-element lens structure enhance image quality and resolution. However, the first lens element usually has positive refractive power and the second lens element usually has negative refractive power. Therefore, this combination tends to result in excessive curvature in a peripheral region of the lens elements. Accordingly, it is not favorable for being applied to the portable electronic products featuring high image quality.

SUMMARY

According to one aspect of the present disclosure, an image lens assembly includes, in order from an object side to an image side, a first lens element, a second lens element, a third lens element, a fourth lens element, a fifth lens element and a sixth lens element. The first lens element with positive refractive power has a convex object-side surface. The second lens element has positive refractive power. The third lens element has refractive power. The fourth lens element has refractive power. The fifth lens element with negative refractive power has a concave object-side surface, wherein both of the object-side surface and an image-side surface of the fifth lens element are aspheric. The sixth lens element with refractive power has a concave image-side surface, wherein the image-side surface of the sixth lens element has at least one inflection point, and both of an object-side surface and the image-side surface of the sixth lens element are aspheric. The image lens assembly has a total of six lens elements with refractive power. When a focal length of the image lens assembly is f, a focal length of the first lens element is f1, a focal length of the second lens element is f2, an axial distance between the object-side surface of the first lens element and the image-side surface of the sixth lens element is Td, and a central thickness of the sixth lens element is CT6 the following conditions are satisfied:

$|f/f1|+|f/f2|<1.80$; and $2.5<Td/CT6<8.5$.

According to another aspect of the present disclosure, an image lens assembly includes, in order from an object side to an image side, a first lens element, a second lens element, a third lens element, a fourth lens element, a fifth lens element and a sixth lens element. The first lens element with positive refractive power has a convex object-side surface. The second lens element has positive refractive power. The third lens element has refractive power. The fourth lens element has refractive power. The fifth lens element with negative refractive power has a concave object-side surface and a convex image-side surface, wherein both of the object-side surface and the image-side surface of the fifth lens element are aspheric. The sixth lens element with refractive power has a concave image-side surface, wherein the image-side surface of the sixth lens element has at least one inflection point, and both of an object-side surface and the image-side surface of the sixth lens element are aspheric. The image lens assembly has a total of six lens elements with refractive power. At least three lens elements among the first through sixth lens elements are made of plastic material. When a focal length of the image lens assembly is f, a focal length of the first lens element is f1, and a focal length of the second lens element is f2, the following condition is satisfied:

$|f/f1|+|f/f2|<1.80$.

According to still another aspect of the present disclosure, an image lens assembly includes, in order from an object side to an image side, a first lens element, a second lens element, a third lens element, a fourth lens element, a fifth lens element and a sixth lens element. The first lens element with positive refractive power has a convex object-side surface. The second lens element has positive refractive power. The third lens element has refractive power. The fourth lens element has refractive power. The fifth lens element has negative refractive power, wherein both of an object-side surface and an image-side surface of the fifth lens element are aspheric. The sixth lens element with refractive power has a concave image-side surface, wherein the image-side surface of the sixth lens element has at least one inflection point, and both of an object-side surface and the image-side surface of the sixth lens element are aspheric. The image lens assembly has a total of six lens elements with refractive power. When a focal length of the image lens assembly is f, a focal length of the first lens element is f1, a focal length of the second lens element is f2, an axial distance between the object-side surface of the first lens element and the image-side surface of the sixth lens element is Td, a central thickness of the sixth lens element is CT6, and a curvature radius of the object-side surface of the fifth lens element is R9, the following conditions are satisfied:

$$|f/f1|+|f/f2|<1.80;$$

$$2.5<Td/CT6<8.5;\text{ and}$$

$$-3.0<f/R9<0.5.$$

According to yet another aspect of the present disclosure, an image capturing device includes the image lens assembly according to the still another aspect.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
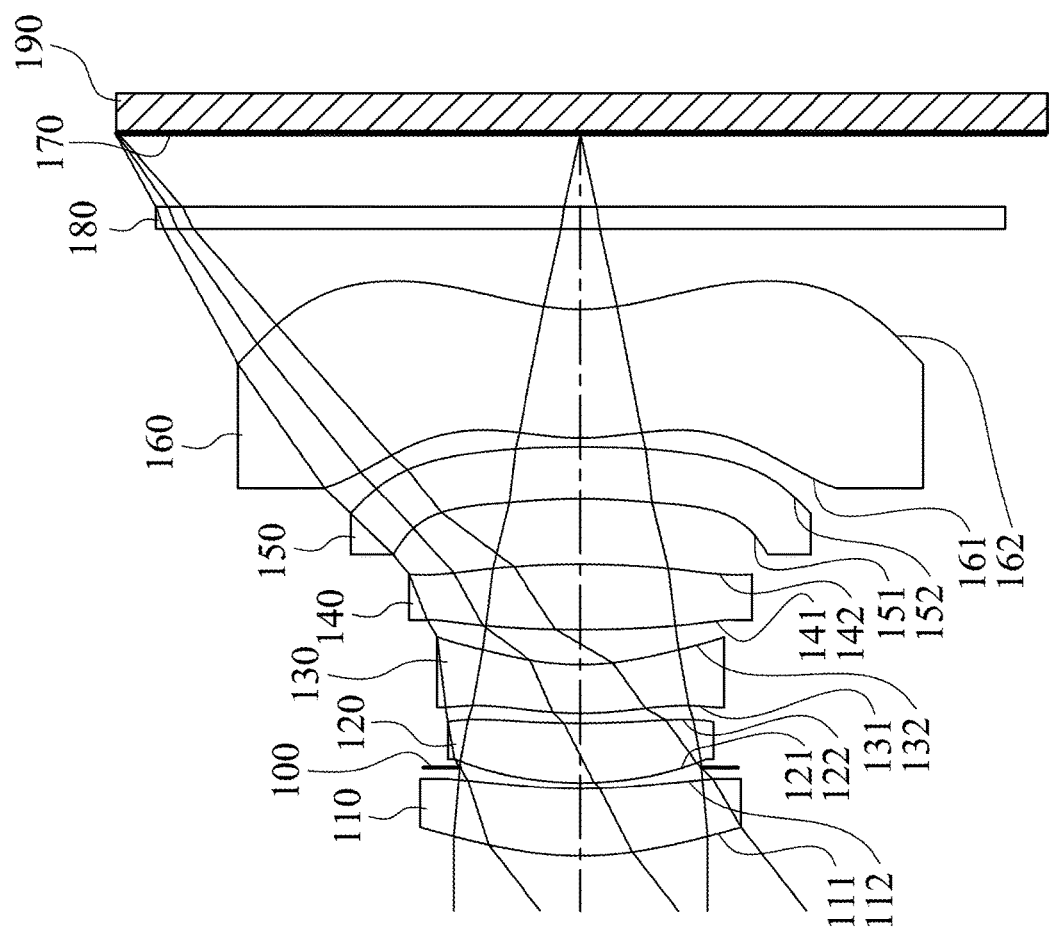
FIG. 1 is a schematic view of an image lens assembly according to the 1st embodiment of the present disclosure.

An image lens assembly includes, in order from an object side to an image side, a first lens element, a second lens element, a third lens element, a fourth lens element, a fifth lens element and a sixth lens element, wherein the image lens assembly has a total of six lens elements with refractive power.

The first lens element with positive refractive power has a convex object-side surface, so that it is favorable for reducing the total track length of the image lens assembly by properly adjusting the positive refractive power of the first lens element.

The second lens element with positive refractive power can have a convex object-side surface and a concave image-side surface. Therefore, it is favorable for balancing the positive refractive power of the first lens element so as to reduce the spherical aberration and correct the astigmatism.

The fourth lens element can have positive refractive power, so that it is favorable for reducing the photosensitivity.

The fifth lens element with negative refractive power can have a concave object-side surface and a convex image-side surface. Therefore, it is favorable for balancing the chromatic aberration correction abilities of the image lens assembly and for correcting the aberration.

The sixth lens element can have a convex object-side surface and has a concave image-side surface. Therefore, it is favorable for the principal point of the image lens assembly being positioned away from the image plane and for reducing the back focal length so as to maintain a compact size of the image lens assembly. Moreover, the image-side surface of the sixth lens element has at least one inflection point. Therefore, it is favorable for correcting the aberration of the off-axis.

When a focal length of the image lens assembly is f, a focal length of the first lens element is f1, and a focal length of the second lens element is f2, the following condition is satisfied: |f/f1|+|f/f2|<1.80. Therefore, it is favorable for avoiding resulting in excessive curvature in a peripheral region of the lens elements and for reducing the aberration of the off-axis. Preferably, the following condition is satisfied: 0.50<|f/f1|+|f/f2|<1.50.

When an axial distance between the object-side surface of the first lens element and the image-side surface of the sixth lens element is Td, and a central thickness of the sixth lens element is CT6, the following condition is satisfied: 2.5<Td/CT6<8.5. Therefore, it is favorable for maintaining a proper total track length.

When the focal length of the image lens assembly is f, and a curvature radius of the object-side surface of the fifth lens element is R9, the following condition is satisfied: $-3.0 < f/R9 < 0.5$. Therefore, it is favorable for correcting the aberration.

When an Abbe number of the third lens element is V3, an Abbe number of the fourth lens element is V4, and an Abbe number of the fifth lens element is V5, the following condition is satisfied: $-30 < V3+V5-V4 < 0$. Therefore, it is favorable for correcting the chromatic aberration of the image lens assembly.

When an axial distance between the third lens element and the fourth lens element is T34, and an axial distance between the fourth lens element and the fifth lens element is T45, the following condition is satisfied: $0.1 < T34/T45 < 0.8$. Therefore, it is favorable for increasing the manufacturing yield rate.

When the focal length of the image lens assembly is f, and an entrance pupil diameter of the image lens assembly is EPD, the following condition is satisfied: $1.4 < f/EPD < 2.6$. Therefore, it is favorable for effectively enhancing the exposure of the image lens assembly.

When a curvature radius of the image-side surface of the sixth lens element is R12, and the focal length of the image lens assembly is f, the following condition is satisfied: $0.20 < R12/f < 0.40$. Therefore, it is favorable for the principal point being positioned away from the image plane so as to reduce the back focal length and to maintain a compact size of the image lens assembly.

When a highest absolute value of a refractive power of a lens element among the first through sixth lens elements of the image lens assembly is Pmax, where the refractive power is defined as a focal length of the image lens assembly divided by a focal length of a lens element, the following condition is satisfied: $|Pmax| < 1.5$. Therefore, it is favorable for balancing the distribution of the refractive powers of the image lens assembly so as to reduce the aberration.

The aforementioned image lens assembly can further include a stop, such as an aperture stop, wherein an axial distance between the stop and an image plane is SL, and an axial distance between the object-side surface of the first lens element and the image plane is TL, the following condition is satisfied: $0.75 < SL/TL < 0.90$. Therefore, it is favorable for balancing the telecentricity and wide-angle feature.

When half of a maximal field of view of the image lens assembly is HFOV, the following condition is satisfied: 36 degrees < HFOV < 50 degrees. Therefore, it is favorable for enlarging the field of view so as to obtain a larger image scene.

When a focal length of the fourth lens element is f4, and a focal length of the fifth lens element is f5, the following condition is satisfied: $-0.90 < f4/f5 < 0$. Therefore, it is favorable for balancing the chromatic aberration correction abilities of the lens elements so as to improve the image quality.

When a central thickness of the fifth lens element is CT5, and the central thickness of the sixth lens element is CT6, the following condition is satisfied: $0.25 < CT5/CT6 < 0.65$. Therefore, it provides favorable moldability and homogeneity for lens elements.

When the focal length of the image lens assembly is f, and the focal length of the fifth lens element is f5, the following condition is satisfied: $-0.70 < f/f5 < 0$. Therefore, it is favorable for effectively correcting the aberration.

When a sum of the central thicknesses from the first through sixth lens elements is $\Sigma CT$, and an axial distance between the object-side surface of the first lens element and the image-side surface of the sixth lens element is Td, the following condition is satisfied: $0.70 < \Sigma CT/Td < 0.90$. Therefore, it is favorable for reducing the total track length of the image lens assembly so as to maintain a compact size thereof.

When the focal length of the first lens element is f1, and the focal length of the second lens element is f2, the following condition is satisfied: $0.1 < f1/f2 < 4.0$. Therefore, it is favorable for reducing the photosensitivity and avoiding excessive spherical aberration.

The aforementioned image lens assembly can further include an image sensor, the image sensor is disposed on the image plane. The axial distance between the object-side surface of the first lens element and the image plane is TL, and a maximum image height of the image lens assembly (half of a diagonal length of an effective photosensitive area of the image sensor) is ImgH, the following condition is satisfied: $TL/ImgH < 1.80$. Therefore, it is favorable for reducing the total track length of the image lens assembly so as to maintain a compact size thereof.

According to the image lens assembly of the present disclosure, the lens elements can be made of plastic or glass material. When the lens elements are made of plastic material, the manufacturing cost thereof can be decreased. When the lens elements are made of glass material, the distribution of the refractive power of the image lens assembly can be more flexible to design. In particular, at least three lens elements among the first through sixth lens elements are made of plastic material. Furthermore, surfaces of each lens element can be aspheric, since the aspheric surface of the lens element is easy to form a shape other than spherical surface so as to have more controllable variables for eliminating the aberration thereof, and to further decrease the required number of the lens elements. Thus, the total track length of the image lens assembly can be effectively reduced.

According to the image lens assembly of the present disclosure, when the lens element has a convex surface, it indicates that the surface is convex in a paraxial region thereof; and when the lens element has a concave surface, it indicates that the surface is concave in a paraxial region thereof. Particularly, the paraxial region thereof refers to the region of the surface where light rays travel close to an optical axis and the off-axis region thereof refers to the region of the surface where light rays travel away from the optical axis.

According to the image lens assembly of the present disclosure, the image lens assembly can include at least one stop, such as an aperture stop, a glare stop or a field stop. Said glare stop or said field stop is for eliminating the stray light and thereby improving the image resolution thereof.

According to the image lens assembly of the present disclosure, an aperture stop can be configured as a front stop or a middle stop. A front stop disposed between an imaged object and a first lens element can provide a longer distance between an exit pupil of the assembly and an image plane; therefore, it improves the image-sensing efficiency of the image sensor. A middle stop disposed between the first lens element and the image plane is favorable for enlarging the field of view of the assembly and thereby provides a wider field of view for the same.

According to the image lens assembly of the present disclosure, the image lens assembly is featured with good correction ability and high image quality, and can be applied to 3D (three-dimensional) image capturing applications, in products such as digital cameras, mobile devices and tablets.

According to the present disclosure, an image capturing device is provided. The image capturing device includes the image lens assembly according to the aforementioned image lens assembly of the present disclosure. Accordingly, through the arrangement of having the first lens element with positive refractive power, the second lens element with positive refractive power and the fifth lens element with negative refractive power, it is favorable for avoiding resulting in excessive curvature in a peripheral region of the lens elements. Moreover, it is favorable for reducing the aberration of the off-axis and balancing the chromatic aberration correction abilities of the lens elements so as to improve the image quality of the image lens assembly.

According to the above description of the present disclosure, the following 1st-10th specific embodiments are provided for further explanation.

1st Embodiment

Figure 2:
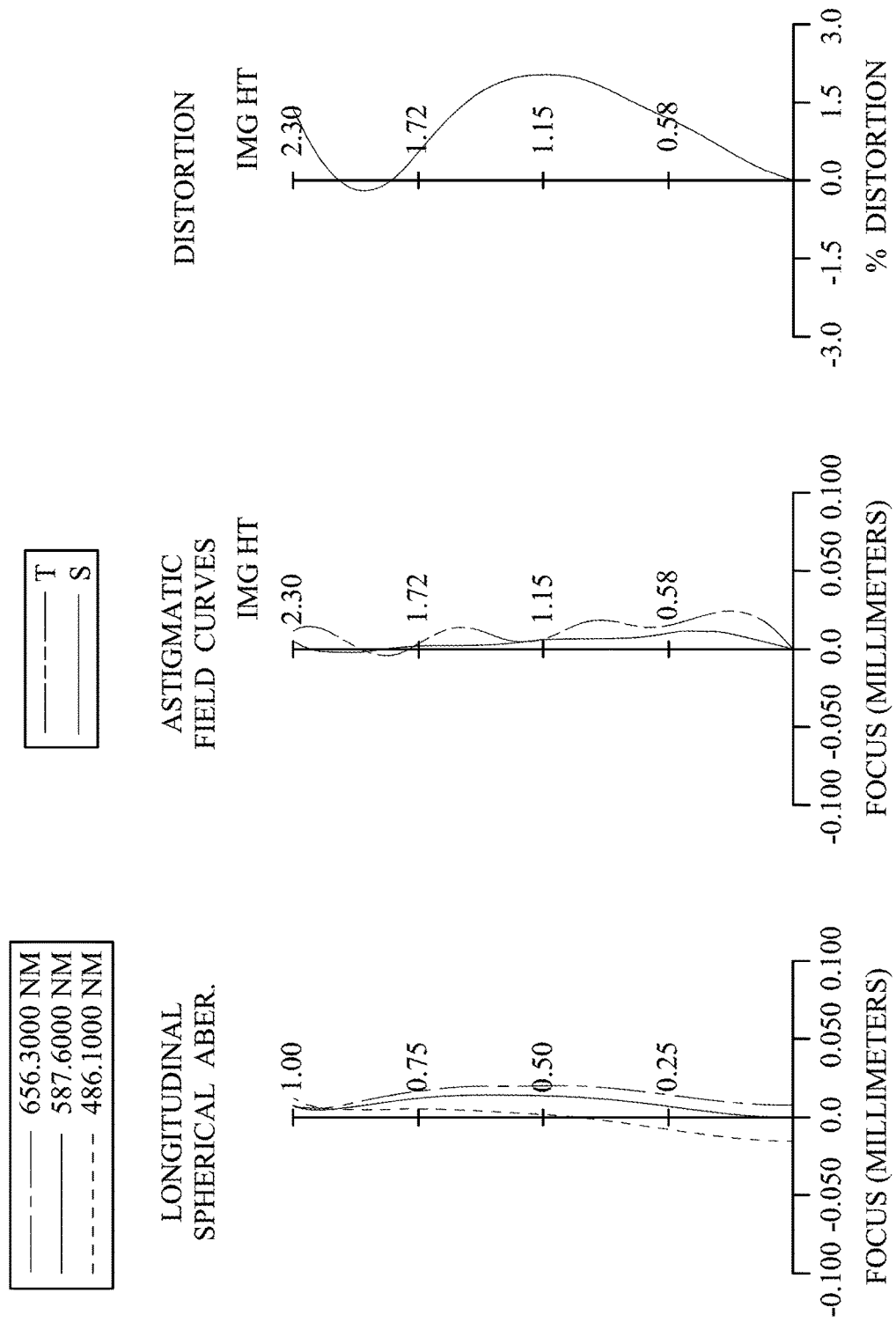
FIG. 2 shows, in order from left to right, spherical aberration curves, astigmatic field curves and a distortion curve of the image lens assembly according to the 1st embodiment.

FIG. 1 is a schematic view of an image lens assembly according to the 1st embodiment of the present disclosure. FIG. 2 shows, in order from left to right, spherical aberration curves, astigmatic field curves and a distortion curve of the image lens assembly according to the 1st embodiment.

In FIG. 1, the image lens assembly includes, in order from an object side to an image side, a first lens element 110, an aperture stop 100, a second lens element 120, a third lens element 130, a fourth lens element 140, a fifth lens element 150, a sixth lens element 160, an IR-cut filter 180, an image plane 170 and an image sensor 190, wherein the image lens assembly has a total of six lens elements (110-160) with refractive power.

The first lens element 110 with positive refractive power has a convex object-side surface 111 and a concave image-side surface 112, which are both aspheric, and the first lens element 110 is made of plastic material.

The second lens element 120 with positive refractive power has a convex object-side surface 121 and a concave image-side surface 122, which are both aspheric, and the second lens element 120 is made of plastic material.

The third lens element 130 with negative refractive power has a convex object-side surface 131 and a concave image-side surface 132, which are both aspheric, and the third lens element 130 is made of plastic material.

The fourth lens element 140 with positive refractive power has a convex object-side surface 141 and a convex image-side surface 142, which are both aspheric, and the fourth lens element 140 is made of plastic material.

The fifth lens element 150 with negative refractive power has a concave object-side surface 151 and a convex image-side surface 152, which are both aspheric, and the fifth lens element 150 is made of plastic material.

The sixth lens element 160 with positive refractive power has a convex object-side surface 161 and a concave image-side surface 162, which are both aspheric, and the sixth lens element 160 is made of plastic material. Moreover, the image-side surface 162 of the sixth lens element 160 has at least one inflection point.

The IR-cut filter 180 is made of glass and located between the sixth lens element 160 and the image plane 170, and will not affect the focal length of the image lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i)$$

wherein,

X is the relative distance between a point on the aspheric surface spaced at a distance Y from the optical axis and the tangential plane at the aspheric surface vertex;

Y is the distance from the point on the curve of the aspheric surface to the optical axis;

R is the curvature radius of the lens elements;

k is the conic coefficient; and

Ai is the i-th aspheric coefficient.

In the image lens assembly according to the 1st embodiment, when a focal length of the image lens assembly is f, an f-number of the image lens assembly is Fno, and half of the maximal field of view of the image lens assembly is HFOV, these parameters have the following values: f=2.89 mm; Fno=2.30; and HFOV=38.0 degrees.

In the image lens assembly according to the 1st embodiment, when an Abbe number of the third lens element 130 is V3, an Abbe number of the fourth lens element 140 is V4, and an Abbe number of the fifth lens element 150 is V5, the following condition is satisfied: V3+V5−V4=−10.9.

In the image lens assembly according to the 1st embodiment, when an axial distance between the third lens element 130 and the fourth lens element 140 is T34, and an axial distance between the fourth lens element 140 and the fifth lens element 150 is T45, the following condition is satisfied: T34/T45=0.54.

In the image lens assembly according to the 1st embodiment, when a central thickness of the fifth lens element 150 is CT5, a central thickness of the sixth lens element 160 is CT6, an axial distance between the object-side surface 111 of the first lens element 110 and the image-side surface 162 of the sixth lens element 160 is Td, and a sum of the central thicknesses from the first through sixth lens elements (110-160) is ΣCT, the following conditions are satisfied: CT5/CT6=0.41; Td/CT6=4.26; and ΣCT/Td=0.77.

In the image lens assembly according to the 1st embodiment, when the focal length of the image lens assembly is f, a curvature radius of the object-side surface 151 of the fifth lens element 150 is R9, and a curvature radius of the image-side surface 162 of the sixth lens element 160 is R12, the following conditions are satisfied: f/R 9=−1.12; and R12/f=0.38.

In the image lens assembly according to the 1st embodiment, when the focal length of the image lens assembly is f, a focal length of the first lens element 110 is f1, a focal length of the second lens element 120 is f2, a focal length of the fourth lens element 140 is f4, and a focal length of the fifth lens element 150 is f5, the following conditions are satisfied: f1/f2=1.41; f4/f5=−0.84; f/f5=−0.47; and |f/f1|+|f/f2|=0.88.

In the image lens assembly according to the 1st embodiment, when a highest absolute value of a refractive power of a lens element among the first through sixth lens elements (110-160) of the image lens assembly is Pmax, the following condition is satisfied: |Pmax|=0.56.

In the image lens assembly according to the 1st embodiment, when the focal length of the image lens assembly is f, and an entrance pupil diameter of the image lens assembly is EPD, the following condition is satisfied: f/EPD=2.30.

In the image lens assembly according to the 1st embodiment, when an axial distance between the aperture stop 100 and the image plane 170 is SL, an axial distance between the object-side surface 111 of the first lens element 110 and the image plane 170 is TL, and a maximum image height of the image lens assembly is ImgH, the following conditions are satisfied: SL/TTL=0.88; and TL/ImgH=1.56.

The detailed optical data of the 1st embodiment are shown in Table 1 and the aspheric surface data are shown in Table 2 below.

TABLE 1

1st Embodiment
f = 2.89 mm, Fno = 2.30, HFOV = 38.0 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 1.741 | ASP | 0.334 | Plastic | 1.535 | 56.3 | 7.92 |
| 2 |  | 2.758 | ASP | 0.105 |  |  |  |  |
| 3 | Ape. Stop | Plano |  | −0.075 |  |  |  |  |
| 4 | Lens 2 | 1.885 | ASP | 0.295 | Plastic | 1.544 | 55.9 | 5.61 |
| 5 |  | 4.656 | ASP | 0.050 |  |  |  |  |
| 6 | Lens 3 | 1.796 | ASP | 0.240 | Plastic | 1.639 | 23.5 | −9.79 |
| 7 |  | 1.323 | ASP | 0.174 |  |  |  |  |
| 8 | Lens 4 | 7.094 | ASP | 0.323 | Plastic | 1.530 | 55.8 | 5.15 |
| 9 |  | −4.372 | ASP | 0.324 |  |  |  |  |
| 10 | Lens 5 | −2.576 | ASP | 0.259 | Plastic | 1.650 | 21.4 | −6.12 |
| 11 |  | −7.597 | ASP | 0.045 |  |  |  |  |
| 12 | Lens 6 | 1.204 | ASP | 0.636 | Plastic | 1.535 | 55.7 | 23.20 |
| 13 |  | 1.088 | ASP | 0.400 |  |  |  |  |
| 14 | IR-cut filter | Plano |  | 0.110 | Glass | 1.517 | 64.2 | — |
| 15 |  | Plano |  | 0.365 |  |  |  |  |
| 16 | Image | Plano |  | — |  |  |  |  |

Note:
Reference wavelength is 587.6 nm (d-line).

TABLE 2

Aspheric Coefficients

| | Surface # | | | | | |
|---|---|---|---|---|---|---|
| | 1 | 2 | 4 | 5 | 6 | 7 |
| k = | −1.0793E+00 | 3.7626E+00 | 3.2993E+00 | 4.3355E+00 | −3.2797E+00 | −5.0731E+00 |
| A4 = | −1.0994E−01 | −1.8250E−01 | 9.0064E−02 | −6.6253E−02 | −4.4825E−01 | −1.0100E−01 |
| A6 = | 3.8737E−02 | −4.0614E−01 | −3.5317E−01 | 1.7093E−01 | 8.6399E−02 | 2.5392E−01 |
| A8 = | −3.2800E−01 | 1.2286E+00 | −2.0860E−02 | −2.7167E+00 | −7.4970E−01 | −2.7246E+00 |
| A10 = | 8.6255E−01 | 1.4736E−01 | 2.0486E+00 | 3.9906E+00 | −1.6803E+00 | 1.0132E+01 |
| A12 = | −7.5958E−01 | −3.3833E+00 | −2.9764E+00 | 1.0922E+00 | 1.1660E+01 | −1.6404E+01 |
| A14 = | 1.9722E−01 | 2.9607E+00 | −1.7410E+00 | −5.5533E+00 | −1.0714E+01 | 1.1030E+01 |

| | Surface # | | | | | |
|---|---|---|---|---|---|---|
| | 8 | 9 | 10 | 11 | 12 | 13 |
| k = | 2.0000E+01 | −2.3820E+01 | −3.2130E+01 | −2.0902E+01 | −1.9879E+01 | −5.5046E+00 |
| A4 = | 5.2620E−02 | 3.4607E−02 | 4.9441E−01 | −3.9135E−01 | −5.4184E−01 | −2.4920E−01 |
| A6 = | −1.7273E−01 | −6.6624E−01 | −2.5936E+00 | 1.8778E+00 | 3.0393E−01 | 1.5074E−01 |
| A8 = | 1.3448E+00 | 2.6950E+00 | 8.4587E+00 | −5.5956E+00 | −6.4734E−02 | −6.0984E−02 |
| A10 = | −3.2058E+00 | −5.0376E+00 | −2.2535E+01 | 9.0074E+00 | 2.7649E−03 | 8.7002E−03 |
| A12 = | 4.8598E−02 | 5.1401E+00 | 3.7891E+01 | −8.1060E+00 | 5.5503E−03 | 4.8607E−04 |
| A14 = | 8.4651E+00 | −2.1425E+00 | −3.4686E+01 | 3.7738E+00 | 4.1216E−04 | −1.2407E−04 |
| A16 = | −8.7671E+00 |  | 1.2786E+01 | −7.0305E−01 | −1.1145E−03 |  |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
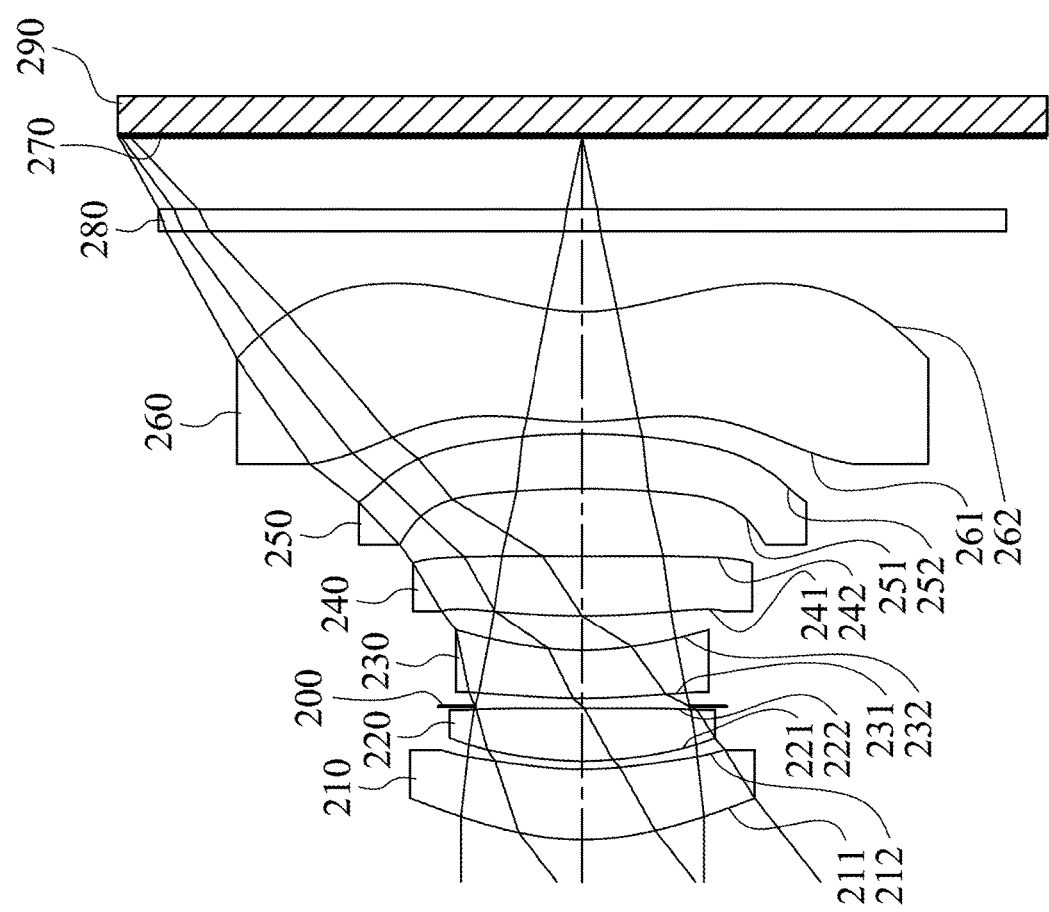
FIG. 3 is a schematic view of an image lens assembly according to the 2nd embodiment of the present disclosure.
Figure 4:
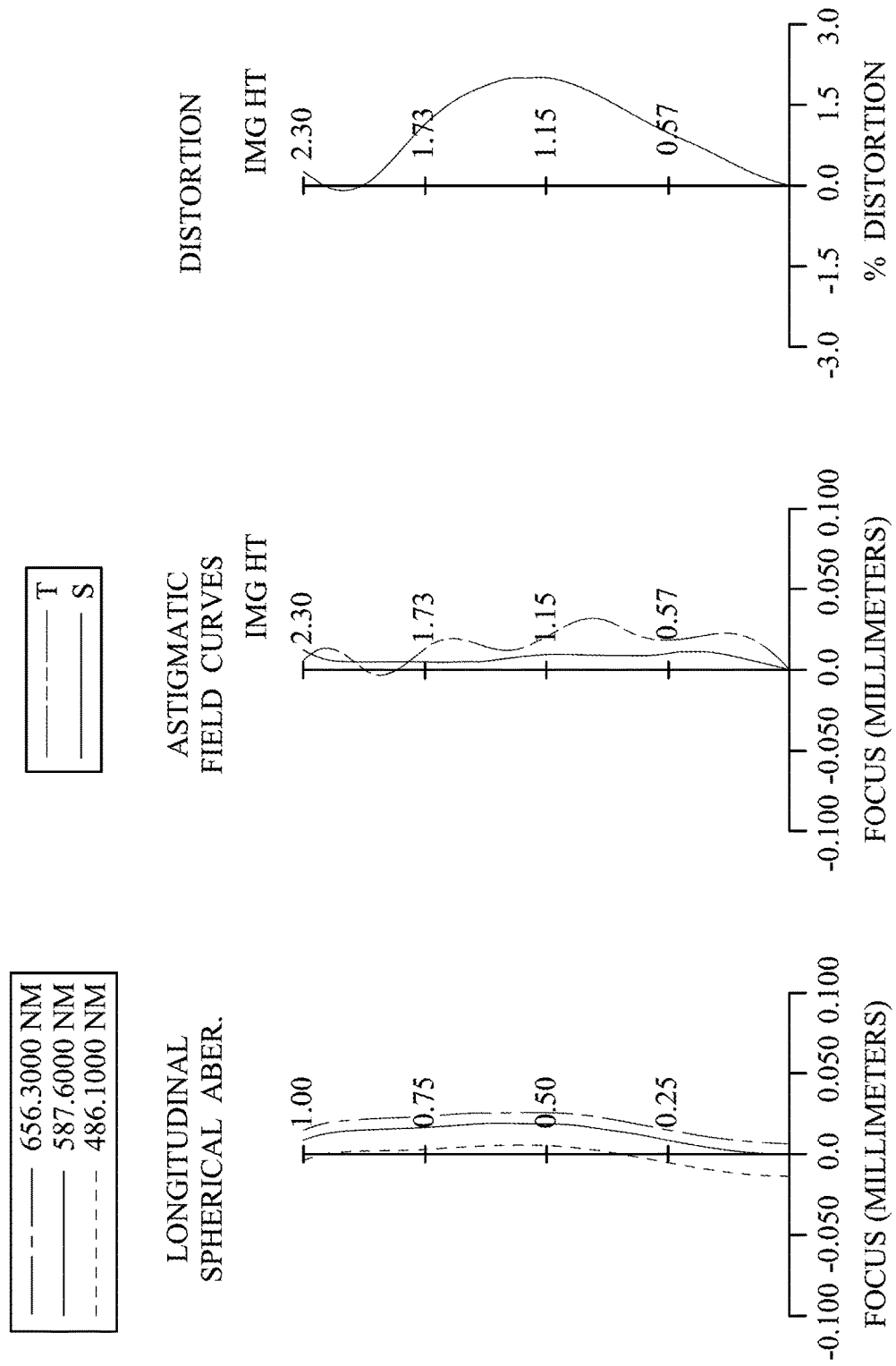
FIG. 4 shows, in order from left to right, spherical aberration curves, astigmatic field curves and a distortion curve of the image lens assembly according to the 2nd embodiment.

FIG. 3 is a schematic view of an image lens assembly according to the 2nd embodiment of the present disclosure. FIG. 4 shows, in order from left to right, spherical aberration curves, astigmatic field curves and a distortion curve of the image lens assembly according to the 2nd embodiment.

In FIG. 3, the image lens assembly includes, in order from an object side to an image side, a first lens element 210, a second lens element 220, an aperture stop 200, a third lens element 230, a fourth lens element 240, a fifth lens element 250, a sixth lens element 260, an IR-cut filter 280, an image plane 270 and an image sensor 290, wherein the image lens assembly has a total of six lens elements (210-260) with refractive power.

The first lens element 210 with positive refractive power has a convex object-side surface 211 and a concave image-side surface 212, which are both aspheric, and the first lens element 210 is made of plastic material.

The second lens element 220 with positive refractive power has a convex object-side surface 221 and a convex image-side surface 222, which are both aspheric, and the second lens element 220 is made of plastic material.

The third lens element 230 with negative refractive power has a convex object-side surface 231 and a concave image-side surface 232, which are both aspheric, and the third lens element 230 is made of plastic material.

The fourth lens element 240 with positive refractive power has a convex object-side surface 241 and a concave image-side surface 242, which are both aspheric, and the fourth lens element 240 is made of plastic material.

The fifth lens element 250 with negative refractive power has a concave object-side surface 251 and a convex image-side surface 252, which are both aspheric, and the fifth lens element 250 is made of plastic material.

The sixth lens element 260 with negative refractive power has a convex object-side surface 261 and a concave image-side surface 262, which are both aspheric, and the sixth lens element 260 is made of plastic material. Moreover, the image-side surface 262 of the sixth lens element 260 has at least one inflection point.

The IR-cut filter 280 is made of glass and located between the sixth lens element 260 and the image plane 270, and will not affect the focal length of the image lens assembly.

The detailed optical data of the 2nd embodiment are shown in Table 3 and the aspheric surface data are shown in Table 4 below.

TABLE 3

2nd Embodiment
f = 2.90 mm, Fno = 2.40, HFOV = 38.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.432 | ASP | 0.350 | Plastic | 1.535 | 55.7 | 9.32 |
| 2 | | 1.837 | ASP | 0.040 | | | | |
| 3 | Lens 2 | 1.831 | ASP | 0.262 | Plastic | 1.544 | 55.9 | 3.28 |
| 4 | | −63.211 | ASP | 0.010 | | | | |
| 5 | Ape. Stop | Plano | | 0.040 | | | | |
| 6 | Lens 3 | 3.253 | ASP | 0.240 | Plastic | 1.639 | 23.5 | −5.23 |
| 7 | | 1.600 | ASP | 0.172 | | | | |
| 8 | Lens 4 | 3.756 | ASP | 0.297 | Plastic | 1.544 | 55.9 | 7.41 |
| 9 | | 53.214 | ASP | 0.336 | | | | |
| 10 | Lens 5 | −3.253 | ASP | 0.272 | Plastic | 1.640 | 23.3 | −64.77 |
| 11 | | −3.645 | ASP | 0.060 | | | | |
| 12 | Lens 6 | 1.472 | ASP | 0.550 | Plastic | 1.535 | 55.7 | −10.44 |
| 13 | | 1.013 | ASP | 0.400 | | | | |
| 14 | IR-cut filter | Plano | | 0.110 | Glass | 1.517 | 64.2 | — |
| 15 | | Plano | | 0.365 | | | | |
| 16 | Image | Plano | | — | | | | |

Note:
Reference wavelength is 587.6 nm (d-line).

TABLE 4

Aspheric Coefficients

| | Surface # | | | | | |
|---|---|---|---|---|---|---|
| | 1 | 2 | 3 | 4 | 6 | 7 |
| k = | −7.1401E−01 | −3.6638E+00 | −1.0462E+00 | 2.0000E+01 | 2.7895E+00 | −1.3567E+01 |
| A4 = | −1.0544E−01 | −2.6709E−01 | −1.0947E−01 | −2.7722E−02 | −3.0874E−01 | 7.9743E−02 |
| A6 = | 6.8936E−02 | −2.0489E−01 | −3.4312E−02 | 5.1444E−01 | 7.9566E−01 | 7.8692E−02 |
| A8 = | −5.9270E−01 | 1.1635E+00 | 4.1311E−01 | −3.3604E+00 | −1.9350E+00 | −2.0136E+00 |
| A10 = | 1.1552E+00 | 5.5052E−01 | 8.6387E−01 | 4.1145E+00 | −4.0312E+00 | 1.0172E+01 |
| A12 = | −5.8850E−01 | −1.1539E+00 | 9.1481E−01 | 6.9217E+00 | 2.8716E+01 | −2.3327E+01 |
| A14 = | −9.0848E−02 | −1.0610E+00 | −5.1813E+00 | −1.4299E+01 | −3.4413E+01 | 2.2195E+01 |

| | Surface # | | | | | |
|---|---|---|---|---|---|---|
| | 8 | 9 | 10 | 11 | 12 | 13 |
| k = | 1.4203E+01 | 2.0000E+01 | −6.1596E+00 | −5.8119E+00 | −3.2411E+01 | −6.9585E+00 |
| A4 = | −1.1935E−01 | 1.0198E−02 | 5.0489E−01 | −2.6703E−01 | −4.8673E−01 | −2.1665E−01 |
| A6 = | −3.3032E−01 | −5.6977E−01 | −2.3597E+00 | 1.6984E+00 | 3.1848E−01 | 1.2255E−01 |
| A8 = | 2.4263E+00 | 2.3399E+00 | 7.5032E+00 | −5.4967E+00 | −6.9345E−02 | −4.5888E−02 |
| A10 = | −7.0765E+00 | −5.0747E+00 | −2.1311E+01 | 8.9809E+00 | −2.0985E−03 | 6.3163E−03 |

TABLE 4-continued

| Aspheric Coefficients | | | | | |
|---|---|---|---|---|---|
| A12 = | 1.5016E+00 | 5.7132E+00 | 3.8084E+01 | −8.1312E+00 | 2.9911E−03 | 2.4616E−04 |
| A14 = | 2.2485E+01 | −2.7750E+00 | −3.6923E+01 | 3.7938E+00 | −2.5923E−04 | −7.3938E−05 |
| A16 = | −2.9628E+01 | | 1.4388E+01 | −6.9575E−01 | −3.0691E−05 | |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.90 | R12/f | 0.35 |
| Fno | 2.40 | f1/f2 | 2.85 |
| HFOV [deg.] | 38.2 | f4/f5 | −0.11 |
| V3 + V5 − V4 | −9.1 | f/f5 | −0.04 |
| T34/T45 | 0.51 | |f/f1| + |f/f2| | 1.20 |
| CT5/CT6 | 0.49 | |Pmax| | 0.89 |
| Td/CT6 | 4.78 | f/EPD | 2.40 |
| ΣCT/Td | 0.75 | SL/TL | 0.81 |
| f/R9 | −0.89 | TL/ImgH | 1.52 |

3rd Embodiment

Figure 5:
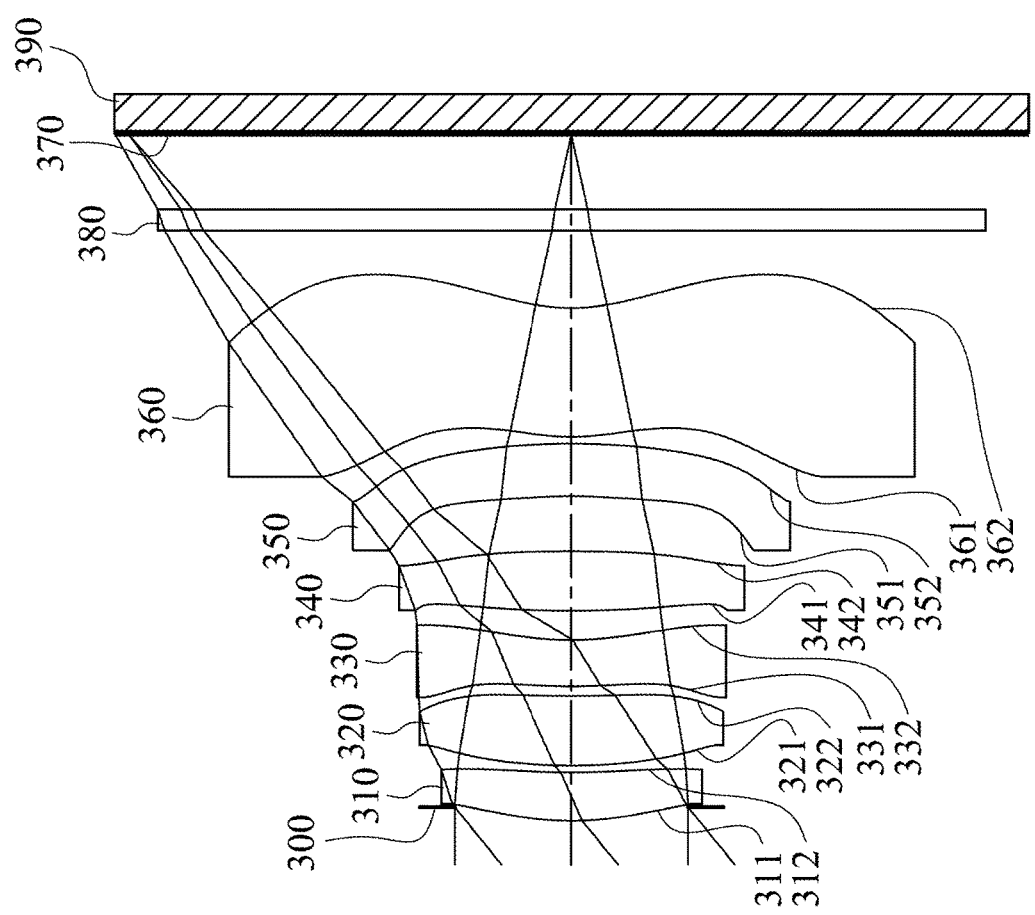
FIG. 5 is a schematic view of an image lens assembly according to the 3rd embodiment of the present disclosure.
Figure 6:
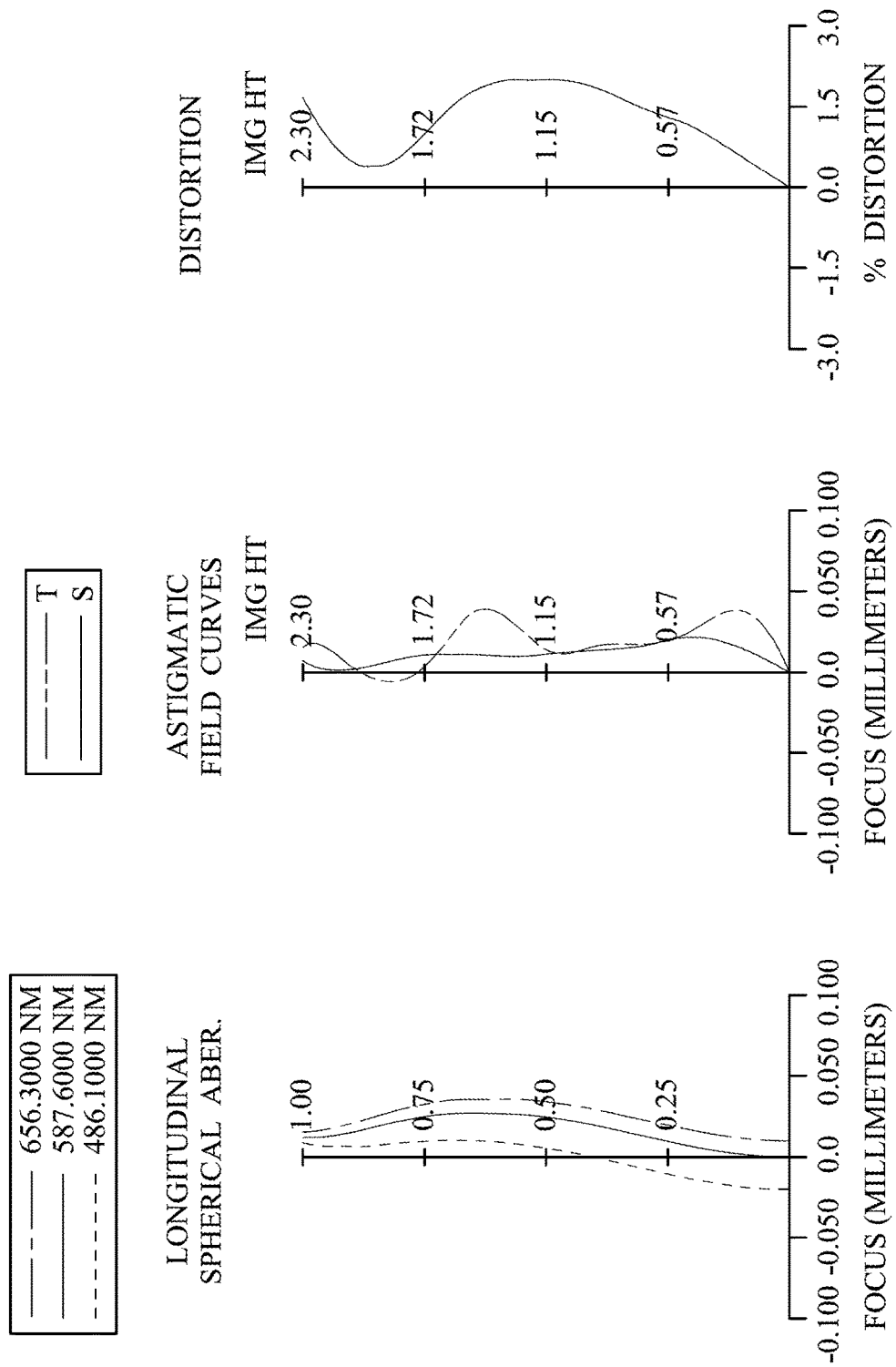
FIG. 6 shows, in order from left to right, spherical aberration curves, astigmatic field curves and a distortion curve of the image lens assembly according to the 3rd embodiment.

FIG. 5 is a schematic view of an image lens assembly according to the 3rd embodiment of the present disclosure. FIG. 6 shows, in order from left to right, spherical aberration curves, astigmatic field curves and a distortion curve of the image lens assembly according to the 3rd embodiment.

In FIG. 5, the image lens assembly includes, in order from an object side to an image side, an aperture stop 300, a first lens element 310, a second lens element 320, a third lens element 330, a fourth lens element 340, a fifth lens element 350, a sixth lens element 360, an IR-cut filter 380, an image plane 370 and an image sensor 390, wherein the image lens assembly has a total of six lens elements (310-360) with refractive power.

The first lens element 310 with positive refractive power has a convex object-side surface 311 and a concave image-side surface 312, which are both aspheric, and the first lens element 310 is made of glass material.

The second lens element 320 with positive refractive power has a convex object-side surface 321 and a concave image-side surface 322, which are both aspheric, and the second lens element 320 is made of plastic material.

The third lens element 330 with negative refractive power has a convex object-side surface 331 and a concave image-side surface 332, which are both aspheric, and the third lens element 330 is made of plastic material.

The fourth lens element 340 with positive refractive power has a convex object-side surface 341 and a convex image-side surface 342, which are both aspheric, and the fourth lens element 340 is made of plastic material.

The fifth lens element 350 with negative refractive power has a concave object-side surface 351 and a convex image-side surface 352, which are both aspheric, and the fifth lens element 350 is made of plastic material.

The sixth lens element 360 with positive refractive power has a convex object-side surface 361 and a concave image-side surface 362, which are both aspheric, and the sixth lens element 360 is made of plastic material. Moreover, the image-side surface 362 of the sixth lens element 360 has at least one inflection point.

The IR-cut filter 380 is made of glass and located between the sixth lens element 360 and the image plane 370, and will not affect the focal length of the image lens assembly.

The detailed optical data of the 3rd embodiment are shown in Table 5 and the aspheric surface data are shown in Table 6 below.

TABLE 5

3rd Embodiment
f = 2.78 mm, Fno = 2.30, HFOV = 38.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.070 | | | | |
| 2 | Lens 1 | 1.715 | ASP | 0.250 | Glass | 1.603 | 38.0 | 4.62 |
| 3 | | 4.215 | ASP | 0.035 | | | | |
| 4 | Lens 2 | 3.108 | ASP | 0.361 | Plastic | 1.544 | 55.9 | 9.22 |
| 5 | | 7.829 | ASP | 0.050 | | | | |
| 6 | Lens 3 | 3.009 | ASP | 0.240 | Plastic | 1.639 | 23.5 | −6.45 |
| 7 | | 1.685 | ASP | 0.154 | | | | |
| 8 | Lens 4 | 5.125 | ASP | 0.309 | Plastic | 1.530 | 55.8 | 5.81 |
| 9 | | −7.537 | ASP | 0.285 | | | | |
| 10 | Lens 5 | −2.513 | ASP | 0.272 | Plastic | 1.650 | 21.4 | −9.46 |
| 11 | | −4.431 | ASP | 0.035 | | | | |
| 12 | Lens 6 | 1.089 | ASP | 0.671 | Plastic | 1.535 | 55.7 | 16.86 |
| 13 | | 0.973 | ASP | 0.400 | | | | |
| 14 | IR-cut filter | Plano | | 0.110 | Glass | 1.517 | 64.2 | — |

TABLE 5-continued

3rd Embodiment
f = 2.78 mm, Fno = 2.30, HFOV = 38.9 deg.

| Surface # | | Curvature Radius | Thickness | Material | Index | Abbe # | Focal Length |
|---|---|---|---|---|---|---|---|
| 15 | | Plano | 0.396 | | | | |
| 16 | Image | Plano | — | | | | |

Note:
Reference wavelength is 587.6 nm (d-line).

TABLE 6

Aspheric Coefficients

| | Surface # | | | | | |
|---|---|---|---|---|---|---|
| | 2 | 3 | 4 | 5 | 6 | 7 |
| k = | −1.5098E+00 | −1.3461E+00 | 3.6122E+00 | −9.0000E+01 | −1.0307E+01 | −1.0671E+01 |
| A4 = | −1.1391E−01 | −1.4239E−01 | 1.1482E−01 | −1.2397E−01 | −5.0305E−01 | −1.2437E−01 |
| A6 = | −5.5349E−02 | −4.3596E−01 | −3.3194E−01 | 8.9093E−02 | 1.6758E−02 | 2.4043E−01 |
| A8 = | −3.5890E−01 | 8.1379E−01 | 1.1988E−01 | −2.7215E+00 | −7.7776E−01 | −2.8249E+00 |
| A10 = | 7.2515E−01 | 2.8553E−01 | 2.1991E+00 | 3.9313E+00 | −1.5808E+00 | 1.0173E+01 |
| A12 = | −1.1192E+00 | −1.6346E+00 | −3.1161E+00 | 1.9145E+00 | 1.0944E+01 | −1.6114E+01 |
| A14 = | 1.4804E+00 | 1.2380E+00 | −3.3031E−01 | −4.4530E+00 | −9.1003E+00 | 9.5068E+00 |

| | Surface # | | | | | |
|---|---|---|---|---|---|---|
| | 8 | 9 | 10 | 11 | 12 | 13 |
| k = | −9.0000E+01 | −6.7476E+00 | −5.0000E+01 | −1.2492E+01 | −1.7233E+01 | −5.2669E+00 |
| A4 = | 3.5163E−02 | −2.2735E−02 | 5.1389E−01 | −3.4345E−01 | −5.0815E−01 | −2.2421E−01 |
| A6 = | −1.9659E−01 | −7.1052E−01 | −2.5914E+00 | 1.8933E+00 | 2.8136E−01 | 1.3904E−01 |
| A8 = | 1.2428E+00 | 2.6692E+00 | 8.4640E+00 | −5.6498E+00 | −6.4635E−02 | −5.7943E−02 |
| A10 = | −3.0279E+00 | −5.0652E+00 | −2.2645E+01 | 8.9998E+00 | 5.0463E−03 | 9.5100E−03 |
| A12 = | 1.0144E+01 | 5.1620E+00 | 3.7847E+01 | −8.0961E+00 | 6.4105E−03 | 3.7537E−04 |
| A14 = | 7.9680E+00 | −2.0569E+00 | −3.4585E+01 | 3.7820E+00 | 5.6469E−04 | −1.8603E−04 |
| A16 = | −8.4328E+00 | | 1.2846E+01 | −6.9747E−01 | −1.3543E−03 | |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.78 | R12/f | 0.35 |
| Fno | 2.30 | f1/f2 | 0.50 |
| HFOV [deg.] | 38.9 | f4/f5 | −0.61 |
| V3 + V5 − V4 | −10.9 | f/f5 | −0.29 |
| T34/T45 | 0.54 | |f/f1| + |f/f2| | 0.91 |
| CT5/CT6 | 0.41 | |Pmax| | 0.60 |
| Td/CT6 | 3.97 | f/EPD | 2.30 |
| ΣCT/Td | 0.79 | SL/TL | 0.98 |
| f/R9 | −1.11 | TL/ImgH | 1.55 |

4th Embodiment

Figure 7:
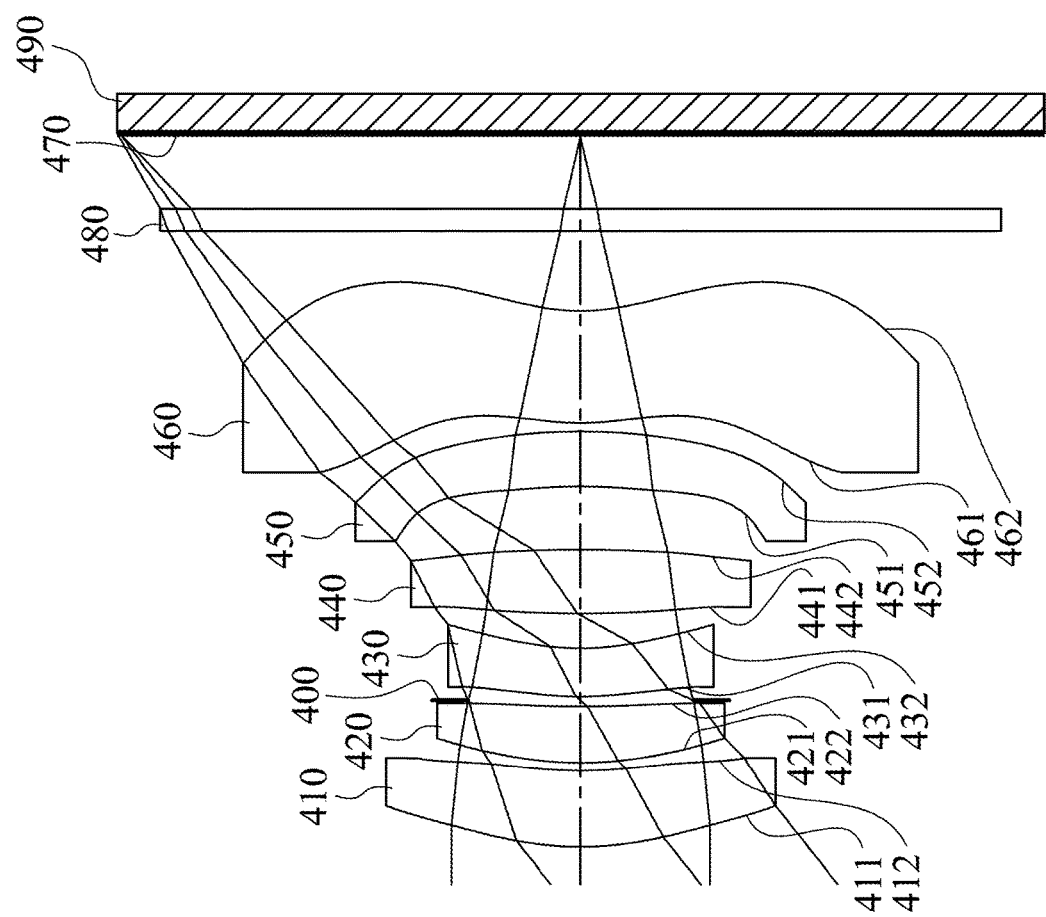
FIG. 7 is a schematic view of an image lens assembly according to the 4th embodiment of the present disclosure.
Figure 8:
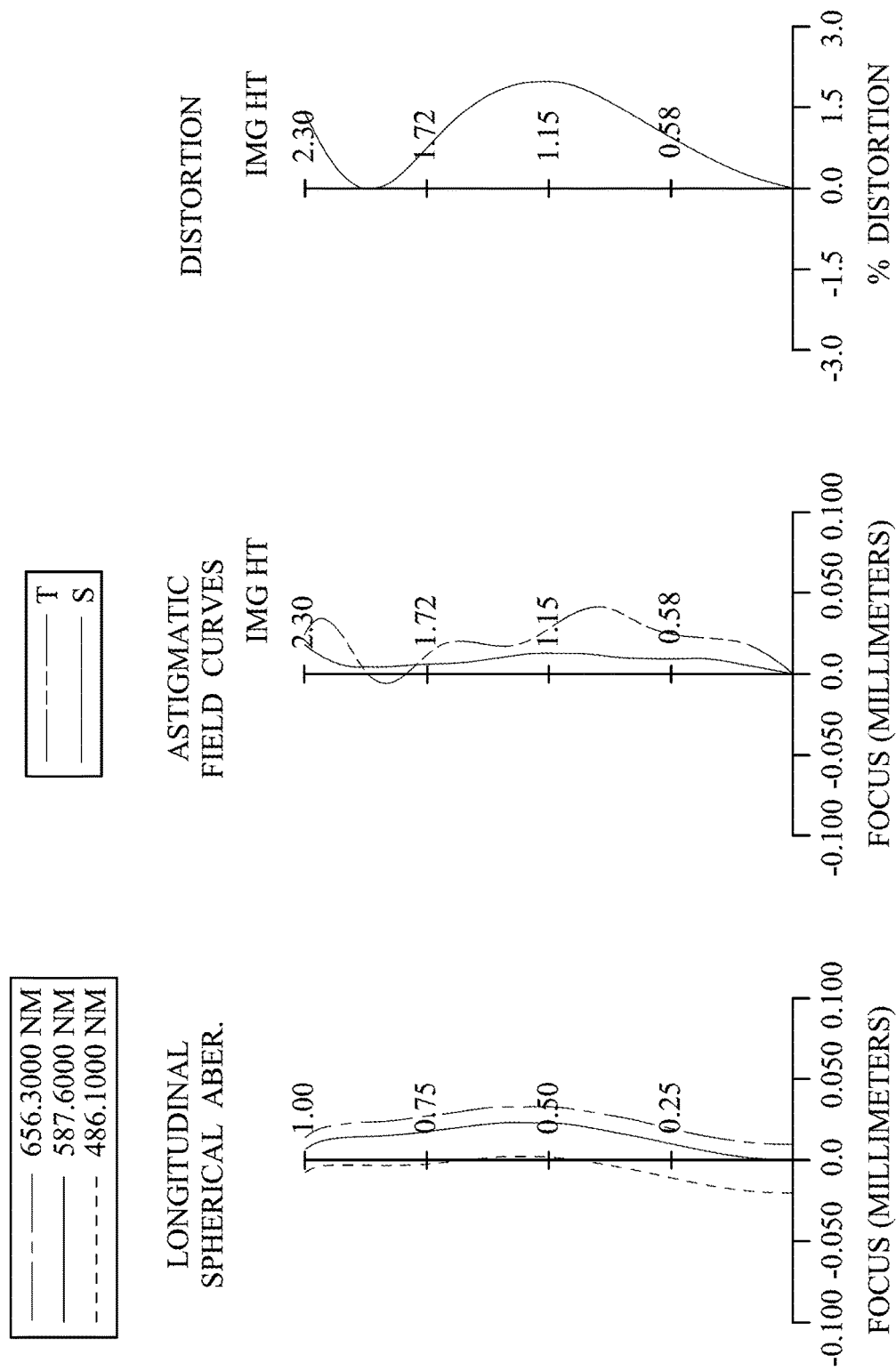
FIG. 8 shows, in order from left to right, spherical aberration curves, astigmatic field curves and a distortion curve of the image lens assembly according to the 4th embodiment.

FIG. 7 is a schematic view of an image lens assembly according to the 4th embodiment of the present disclosure. FIG. 8 shows, in order from left to right, spherical aberration curves, astigmatic field curves and a distortion curve of the image lens assembly according to the 4th embodiment.

In FIG. 7, the image lens assembly includes, in order from an object side to an image side, a first lens element 410, a second lens element 420, an aperture stop 400, a third lens element 430, a fourth lens element 440, a fifth lens element 450, a sixth lens element 460, an IR-cut filter 480, an image plane 470 and an image sensor 490, wherein the image lens assembly has a total of six lens elements (410-460) with refractive power.

The first lens element 410 with positive refractive power has a convex object-side surface 411 and a concave image-side surface 412, which are both aspheric, and the first lens element 410 is made of glass material.

The second lens element 420 with positive refractive power has a convex object-side surface 421 and a concave image-side surface 422, which are both aspheric, and the second lens element 420 is made of plastic material.

The third lens element 430 with negative refractive power has a convex object-side surface 431 and a concave image-side surface 432, which are both aspheric, and the third lens element 430 is made of plastic material.

The fourth lens element 440 with positive refractive power has a convex object-side surface 441 and a convex image-side surface 442, which are both aspheric, and the fourth lens element 440 is made of plastic material.

The fifth lens element 450 with negative refractive power has a concave object-side surface 4451 and a convex image-side surface 452, which are both aspheric, and the fifth lens element 450 is made of plastic material.

The sixth lens element 460 with negative refractive power has a convex object-side surface 461 and a concave image-side surface 462, which are both aspheric, and the sixth lens element 460 is made of plastic material. Moreover, the image-side surface 462 of the sixth lens element 460 has at least one inflection point.

The IR-cut filter 480 is made of glass and located between the sixth lens element 460 and the image plane 470, and will not affect the focal length of the image lens assembly.

The detailed optical data of the 4th embodiment are shown in Table 7 and the aspheric surface data are shown in Table 8 below.

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

TABLE 7

4th Embodiment
f = 2.84 mm, Fno = 2.20, HFOV = 38.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.654 | ASP | 0.381 | Glass | 1.583 | 46.5 | 9.10 |
| 2 | | 2.198 | ASP | 0.040 | | | | |
| 3 | Lens 2 | 1.888 | ASP | 0.282 | Plastic | 1.544 | 55.9 | 4.38 |
| 4 | | 8.589 | ASP | 0.030 | | | | |
| 5 | Ape. Stop | Plano | | 0.020 | | | | |
| 6 | Lens 3 | 2.042 | ASP | 0.240 | Plastic | 1.639 | 23.5 | −8.18 |
| 7 | | 1.401 | ASP | 0.173 | | | | |
| 8 | Lens 4 | 5.553 | ASP | 0.318 | Plastic | 1.530 | 55.8 | 6.10 |
| 9 | | −7.593 | ASP | 0.315 | | | | |
| 10 | Lens 5 | −2.482 | ASP | 0.277 | Plastic | 1.640 | 23.3 | −16.90 |
| 11 | | −3.361 | ASP | 0.043 | | | | |
| 12 | Lens 6 | 1.257 | ASP | 0.558 | Plastic | 1.535 | 55.7 | −28.73 |
| 13 | | 0.982 | ASP | 0.400 | | | | |
| 14 | IR-cut filter | Plano | | 0.110 | Glass | 1.517 | 64.2 | — |
| 15 | | Plano | | 0.378 | | | | |
| 16 | Image | Plano | | — | | | | |

Note:
Reference wavelength is 587.6 nm (d-line).

TABLE 8

Aspheric Coefficients

| | Surface # | | | | | |
|---|---|---|---|---|---|---|
| | 1 | 2 | 3 | 4 | 6 | 7 |
| k = | −7.6710E−01 | −3.4884E−02 | 1.8009E+00 | 1.8641E+01 | 1.5938E+00 | −7.2521E+00 |
| A4 = | −1.0863E−01 | −3.0626E−01 | −6.2163E−02 | 7.3608E−02 | −3.5478E−01 | −1.6692E−02 |
| A6 = | 7.1389E−02 | −3.8619E−01 | −3.9555E−01 | 2.2477E−01 | 3.0828E−01 | 2.6537E−01 |
| A8 = | −4.5083E−01 | 1.2390E+00 | 5.3105E−01 | −3.1762E+00 | −1.1746E+00 | −2.7155E+00 |
| A10 = | 8.4732E−01 | 1.4261E−01 | 1.4103E+00 | 4.6345E+00 | −2.8770E+00 | 9.8436E+00 |
| A12 = | −6.6730E−01 | −2.7194E+00 | −4.4166E+00 | 5.6979E−01 | 1.5133E+01 | −1.7872E+01 |
| A14 = | 2.1872E−01 | 2.2618E+00 | 3.5302E+00 | −2.7617E+00 | −1.2691E+01 | 1.3814E+01 |

| | Surface # | | | | | |
|---|---|---|---|---|---|---|
| | 8 | 9 | 10 | 11 | 12 | 13 |
| k = | 2.0000E+01 | −2.0584E+01 | −3.5860E+01 | −1.0000E+00 | −2.1408E+01 | −5.9762E+00 |
| A4 = | −2.9632E−02 | 4.9999E−02 | 4.6362E−01 | −2.9895E−01 | −5.6157E−01 | −2.5048E−01 |
| A6 = | −2.4835E−01 | −7.2635E−01 | −2.3963E+00 | 1.8167E+00 | 3.3538E−01 | 1.4963E−01 |
| A8 = | 1.6753E+00 | 2.5382E+00 | 8.0263E+00 | −5.5603E+00 | −6.3962E−02 | −5.9460E−02 |
| A10 = | −3.9565E+00 | −4.9053E+00 | −2.2089E+01 | 8.9876E+00 | −1.8444E−03 | 8.2091E−03 |
| A12 = | 1.9749E−01 | 5.3042E+00 | 3.7846E+01 | −8.1231E+00 | 3.1349E−03 | 5.6244E−04 |
| A14 = | 1.1016E+01 | −2.3770E+00 | −3.5202E+01 | 3.7777E+00 | 5.4227E−05 | −1.3049E−04 |
| A16 = | −1.2478E+01 | | 1.3174E+01 | −6.9229E−01 | −3.1823E−04 | |

| 4th Embodiment | | | |
|---|---|---|---|
| f [mm] | 2.84 | R12/f | 0.35 |
| Fno | 2.20 | f1/f2 | 2.08 |
| HFOV [deg.] | 38.4 | f4/f5 | −0.36 |
| V3 + V5 − V4 | −9.0 | f/f5 | −0.17 |
| T34/T45 | 0.55 | \|f/f1\| + \|f/f2\| | 0.96 |
| CT5/CT6 | 0.50 | \|Pmax\| | 0.65 |
| Td/CT6 | 4.80 | f/EPD | 2.20 |
| ΣCT/Td | 0.77 | SL/TL | 0.79 |
| f/R9 | −1.14 | TL/ImgH | 1.55 |

5th Embodiment

Figure 9:
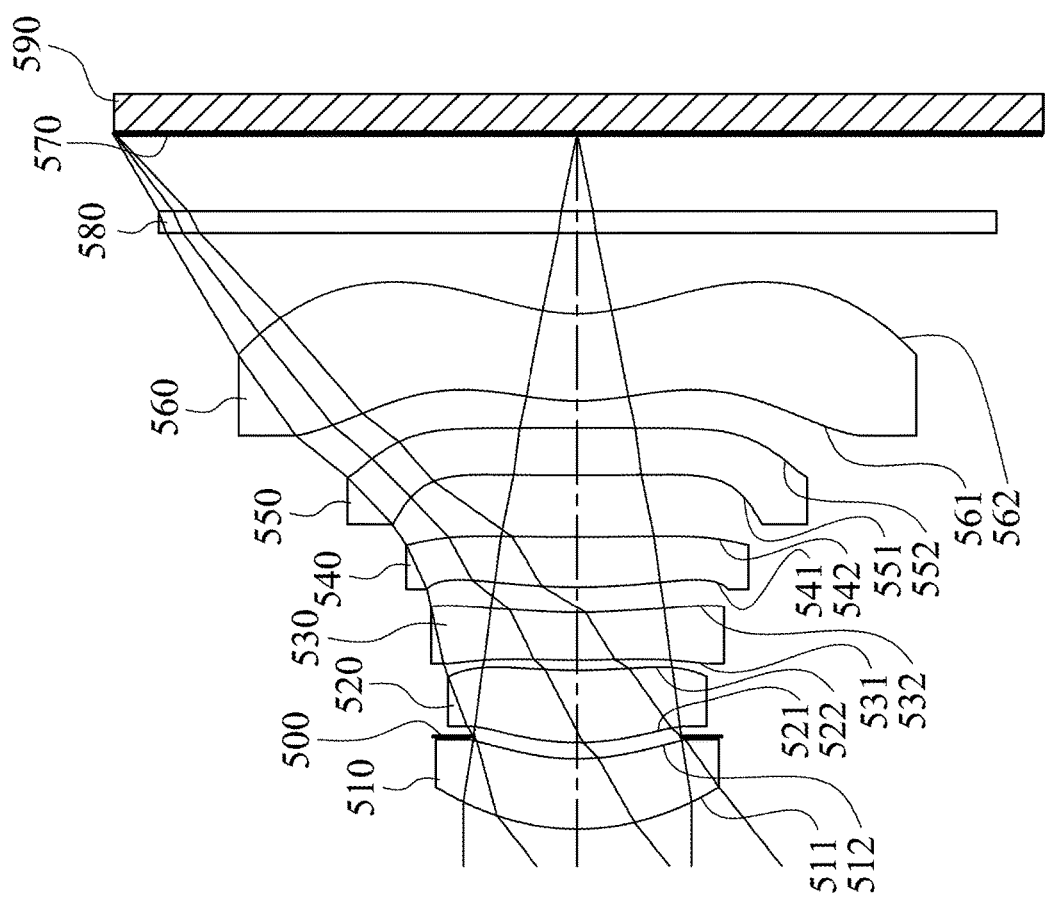
FIG. 9 is a schematic view of an image lens assembly according to the 5th embodiment of the present disclosure.
Figure 10:
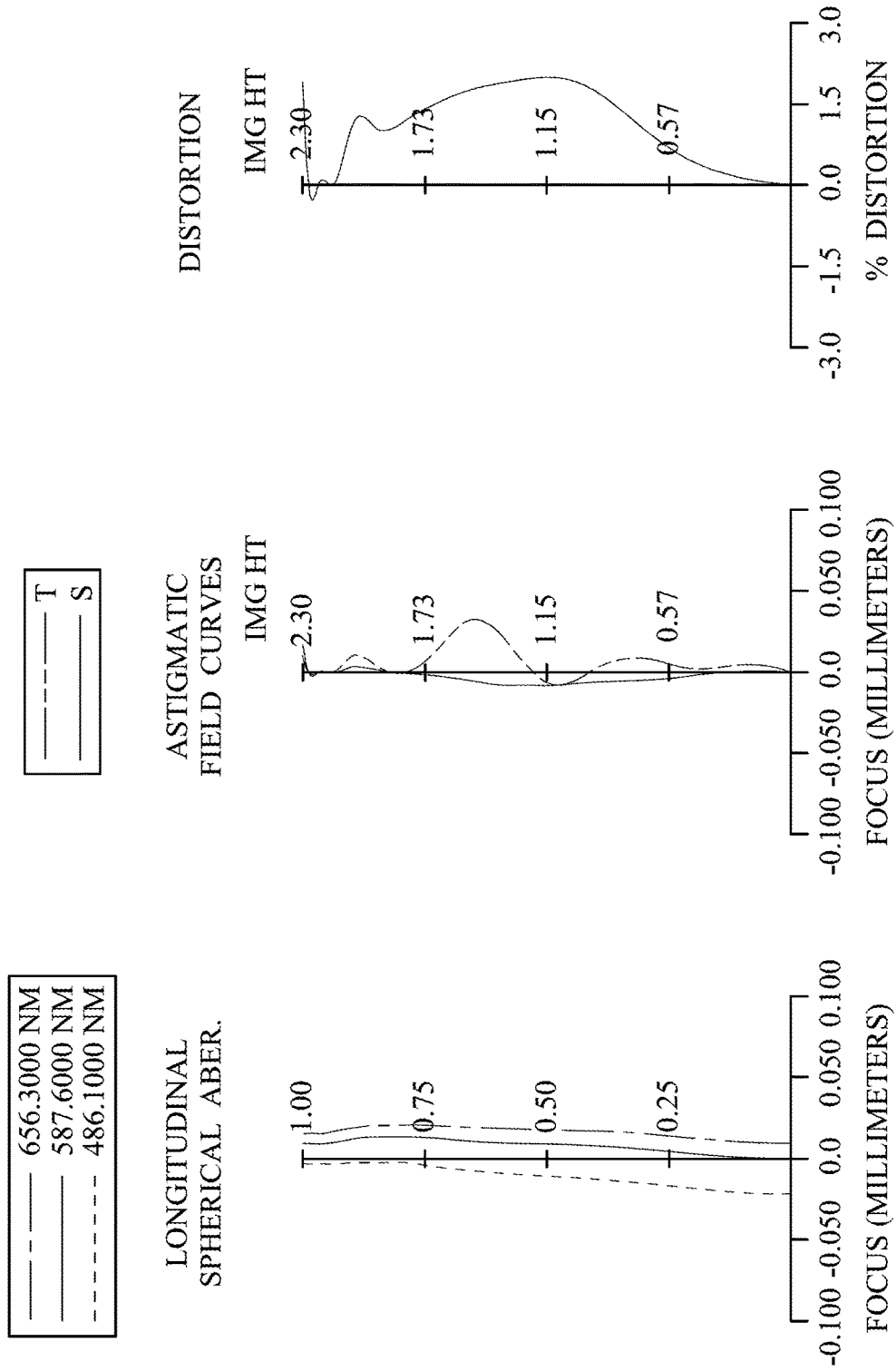
FIG. 10 shows, in order from left to right, spherical aberration curves, astigmatic field curves and a distortion curve of the image lens assembly according to the 5th embodiment.

FIG. 9 is a schematic view of an image lens assembly according to the 5th embodiment of the present disclosure. FIG. 10 shows, in order from left to right, spherical aberration curves, astigmatic field curves and a distortion curve of the image lens assembly according to the 5th embodiment.

In FIG. 9, the image lens assembly includes, in order from an object side to an image side, a first lens element 510, an aperture stop 500, a second lens element 520, a third lens element 530, a fourth lens element 540, a fifth lens element 550, a sixth lens element 560, an IR-cut filter 580, an image plane 570 and an image sensor 590, wherein the image lens assembly has a total of six lens elements (510-560) with refractive power.

The first lens element 510 with positive refractive power has a convex object-side surface 511 and a concave image-side surface 512, which are both aspheric, and the first lens element 510 is made of plastic material.

The second lens element 520 with positive refractive power has a convex object-side surface 521 and a concave image-side surface 522, which are both aspheric, and the second lens element 520 is made of plastic material.

The third lens element 530 with negative refractive power has a convex object-side surface 531 and a concave image-side surface 532, which are both aspheric, and the third lens element 530 is made of plastic material.

The fourth lens element 540 with positive refractive power has a convex object-side surface 541 and a concave image-side surface 542, which are both aspheric, and the fourth lens element 540 is made of plastic material.

The fifth lens element 550 with negative refractive power has a concave object-side surface 551 and a concave image-side surface 552, which are both aspheric, and the fifth lens element 550 is made of plastic material.

The sixth lens element 560 with negative refractive power has a convex object-side surface 561 and a concave image-side surface 562, which are both aspheric, and the sixth lens element 560 is made of plastic material. Moreover, the image-side surface 562 of the sixth lens element 560 has at least one inflection point.

The IR-cut filter 580 is made of glass and located between the sixth lens element 560 and the image plane 570, and will not affect the focal length of the image lens assembly.

The detailed optical data of the 5th embodiment are shown in Table 9 and the aspheric surface data are shown in Table 10 below.

TABLE 9

5th Embodiment
f = 2.83 mm, Fno = 2.50, HFOV = 38.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.210 | ASP | 0.349 | Plastic | 1.514 | 56.8 | 25.33 |
| 2 | | 1.204 | ASP | 0.110 | | | | |
| 3 | Ape. Stop | Plano | | −0.030 | | | | |
| 4 | Lens 2 | 1.253 | ASP | 0.359 | Plastic | 1.544 | 55.9 | 3.68 |
| 5 | | 3.003 | ASP | 0.050 | | | | |
| 6 | Lens 3 | 5.208 | ASP | 0.238 | Plastic | 1.640 | 23.3 | −10.91 |
| 7 | | 2.930 | ASP | 0.126 | | | | |
| 8 | Lens 4 | 2.971 | ASP | 0.250 | Plastic | 1.544 | 55.9 | 6.37 |
| 9 | | 20.164 | ASP | 0.306 | | | | |
| 10 | Lens 5 | −148.368 | ASP | 0.235 | Plastic | 1.640 | 23.3 | −46.92 |
| 11 | | 37.652 | ASP | 0.133 | | | | |
| 12 | Lens 6 | 1.131 | ASP | 0.436 | Plastic | 1.544 | 55.9 | −16.89 |
| 13 | | 0.870 | ASP | 0.400 | | | | |
| 14 | IR-cut filter | Plano | | 0.110 | Glass | 1.517 | 64.2 | — |
| 15 | | Plano | | 0.384 | | | | |
| 16 | Image | Plano | | — | | | | |

Note:
Reference wavelength is 587.6 nm (d-line).

TABLE 10

Aspheric Coefficients

| | Surface # | | | | | |
|---|---|---|---|---|---|---|
| | 1 | 2 | 4 | 5 | 6 | 7 |
| k = | −1.4455E−01 | −1.4050E+00 | −2.0799E+00 | −2.9234E+01 | 4.0706E+00 | −6.9438E+01 |
| A4 = | −7.4529E−02 | −1.6598E−01 | −1.2951E−01 | −3.4622E−01 | −6.2454E−01 | −1.0534E−01 |
| A6 = | 2.4281E−01 | −3.3473E−01 | −2.2297E−01 | 4.9113E−01 | 1.1132E+00 | 1.0788E−01 |
| A8 = | −9.7674E−01 | 5.8817E−01 | −1.1745E+00 | −3.9583E+00 | −1.4033E+00 | −1.4487E+00 |

TABLE 10-continued

| Aspheric Coefficients | | | | | | |
|---|---|---|---|---|---|---|
| A10 = | 1.5557E+00 | −1.4064E+00 | −1.5924E+00 | 1.8404E+00 | −3.7761E+00 | 9.4391E+00 |
| A12 = | −1.0520E−02 | −7.4048E+00 | 1.4306E+00 | 8.2764E+00 | 1.8735E+01 | −2.0111E+01 |
| A14 = | −1.7343E+00 | 9.3588E+00 | −1.1443E+01 | −4.6942E+00 | −1.7499E+01 | 1.2839E+01 |

| | Surface # | | | | | |
|---|---|---|---|---|---|---|
| | 8 | 9 | 10 | 11 | 12 | 13 |
| k = | 1.3380E+01 | −7.6604E+00 | −5.0000E+01 | −2.5500E+01 | −1.2867E+01 | −5.9134E+00 |
| A4 = | −1.2007E−01 | 4.0322E−02 | 2.5459E−01 | −2.7575E−01 | −4.6077E−01 | −2.3826E−01 |
| A6 = | −1.0428E+00 | −7.6629E−01 | −1.3752E+00 | 1.7027E+00 | 2.7997E−01 | 1.2000E−01 |
| A8 = | 4.5130E+00 | 2.5959E+00 | 5.1180E+00 | −5.5676E+00 | −6.9088E−02 | −4.1027E−02 |
| A10 = | −1.0438E+01 | −5.3092E+00 | −1.8889E+01 | 8.9698E+00 | 1.6642E−03 | 5.5223E−03 |
| A12 = | −6.5589E−01 | 4.8891E+00 | 3.8222E+01 | −8.0820E+00 | 3.9780E−03 | 1.9650E−04 |
| A14 = | 3.3589E+01 | −1.4367E+00 | −3.9133E+01 | 3.8347E+00 | −5.9331E−04 | −6.2353E−05 |
| A16 = | −3.7639E+01 | | 1.5601E+01 | −7.3484E−01 | −9.6263E−05 | |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.83 | R12/f | 0.31 |
| Fno | 2.50 | f1/f2 | 6.88 |
| HFOV [deg.] | 38.5 | f4/f5 | −0.14 |
| V3 + V5 − V4 | −9.3 | f/f5 | −0.06 |
| T34/T45 | 0.41 | |f/f1| + |f/f2| | 0.88 |
| CT5/CT6 | 0.54 | |Pmax| | 0.77 |
| Td/CT6 | 5.88 | f/EPD | 2.50 |
| ΣCT/Td | 0.73 | SL/TL | 0.87 |
| f/R9 | −0.02 | TL/ImgH | 1.50 |

6th Embodiment

Figure 11:
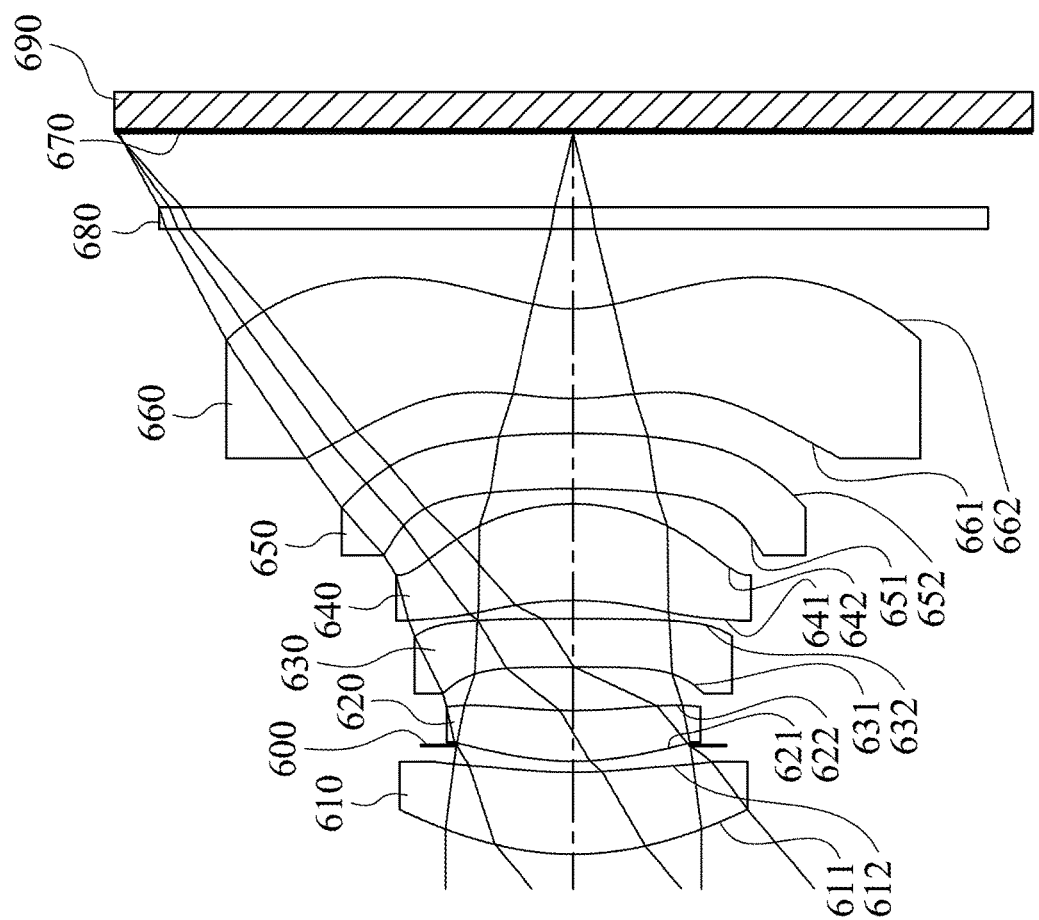
FIG. 11 is a schematic view of an image lens assembly according to the 6th embodiment of the present disclosure.
Figure 12:
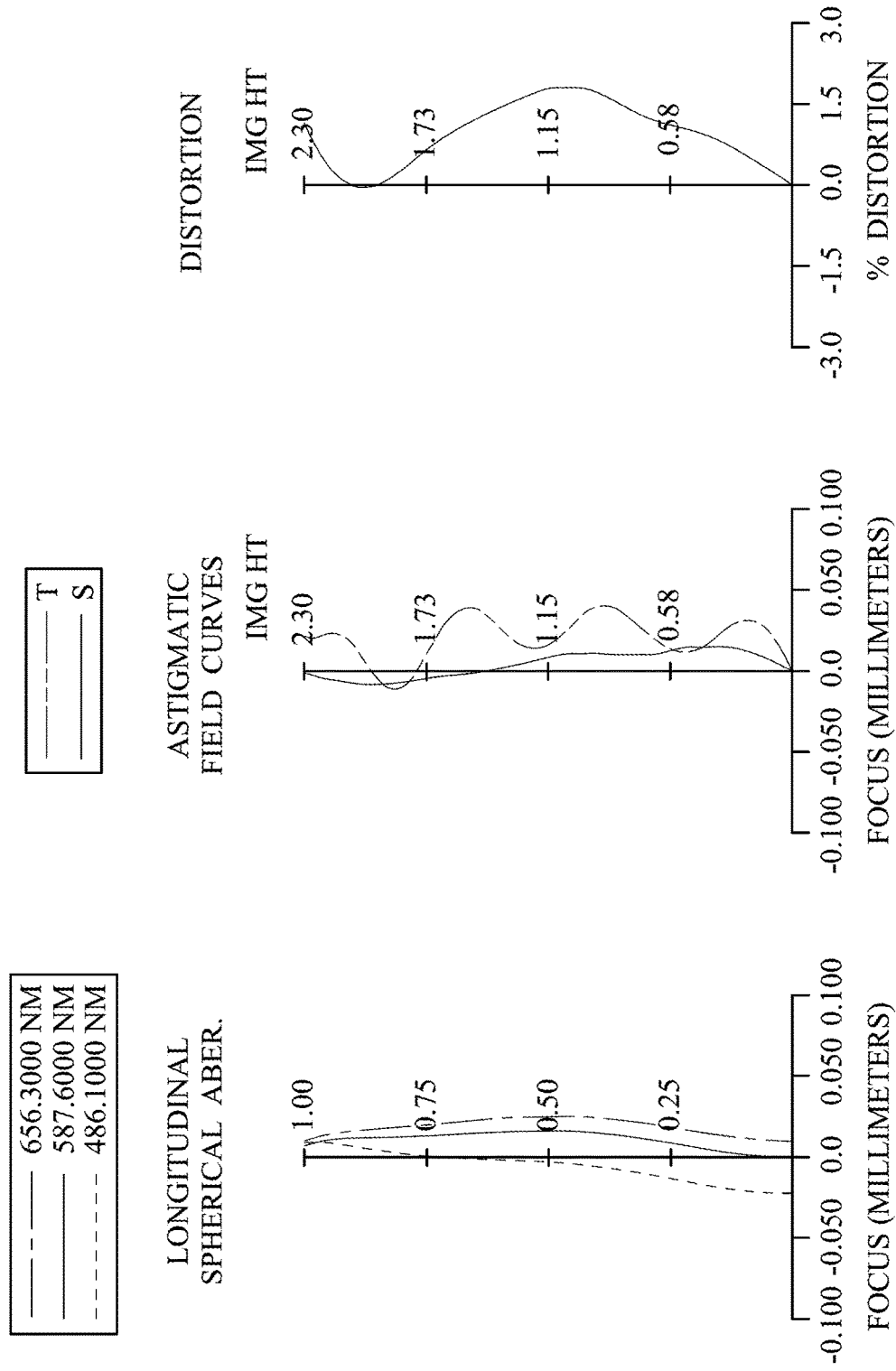
FIG. 12 shows, in order from left to right, spherical aberration curves, astigmatic field curves and a distortion curve of the image lens assembly according to the 6th embodiment.

FIG. 11 is a schematic view of an image lens assembly according to the 6th embodiment of the present disclosure. FIG. 12 shows, in order from left to right, spherical aberration curves, astigmatic field curves and a distortion curve of the image lens assembly according to the 6th embodiment.

In FIG. 11, the image lens assembly includes, in order from an object side to an image side, a first lens element 610, an aperture stop 600, a second lens element 620, a third lens element 630, a fourth lens element 640, a fifth lens element 650, a sixth lens element 660, an IR-cut filter 680, an image plane 670 and an image sensor 690, wherein the image lens assembly has a total of six lens elements (610-660) with refractive power.

The first lens element 610 with positive refractive power has a convex object-side surface 611 and a concave image-side surface 612, which are both aspheric, and the first lens element 610 is made of plastic material.

The second lens element 620 with positive refractive power has a convex object-side surface 621 and a concave image-side surface 622, which are both aspheric, and the second lens element 620 is made of plastic material.

The third lens element 630 with positive refractive power has a concave object-side surface 631 and a convex image-side surface 632, which are both aspheric, and the third lens element 630 is made of plastic material.

The fourth lens element 640 with positive refractive power has a concave object-side surface 641 and a convex image-side surface 642, which are both aspheric, and the fourth lens element 640 is made of plastic material.

The fifth lens element 650 with negative refractive power has a concave object-side surface 651 and a convex image-side surface 652, which are both aspheric, and the fifth lens element 650 is made of plastic material.

The sixth lens element 660 with negative refractive power has a convex object-side surface 661 and a concave image-side surface 662, which are both aspheric, and the sixth lens element 660 is made of plastic material. Moreover, the image-side surface 662 of the sixth lens element 660 has at least one inflection point.

The IR-cut filter 680 is made of glass and located between the sixth lens element 660 and the image plane 670, and will not affect the focal length of the image lens assembly.

The detailed optical data of the 6th embodiment are shown in Table 11 and the aspheric surface data are shown in Table 12 below.

TABLE 11

6th Embodiment
f = 2.68 mm, Fno = 2.10, HFOV = 40.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.598 | ASP | 0.414 | Plastic | 1.535 | 56.3 | 7.06 |
| 2 | | 2.519 | ASP | 0.134 | | | | |
| 3 | Ape. Stop | Plano | | −0.079 | | | | |

TABLE 11-continued

6th Embodiment
f = 2.68 mm, Fno = 2.10, HFOV = 40.2 deg.

| Surface # | | Curvature Radius | Thickness | Material | Index | Abbe # | Focal Length |
|---|---|---|---|---|---|---|---|
| 4 | Lens 2 | 1.449 ASP | 0.255 | Plastic | 1.514 | 56.8 | 5.14 |
| 5 | | 3.021 ASP | 0.218 | | | | |
| 6 | Lens 3 | −23.975 ASP | 0.242 | Plastic | 1.650 | 21.4 | 1694.54 |
| 7 | | −23.557 ASP | 0.092 | | | | |
| 8 | Lens 4 | −1.739 ASP | 0.484 | Plastic | 1.530 | 55.8 | 4.21 |
| 9 | | −1.072 ASP | 0.077 | | | | |
| 10 | Lens 5 | −3.827 ASP | 0.280 | Plastic | 1.614 | 25.6 | −20.86 |
| 11 | | −5.610 ASP | 0.175 | | | | |
| 12 | Lens 6 | 1.376 ASP | 0.450 | Plastic | 1.640 | 23.3 | −4.62 |
| 13 | | 0.819 ASP | 0.400 | | | | |
| 14 | IR-cut filter | Plano | 0.110 | Glass | 1.517 | 64.2 | — |
| 15 | | Plano | 0.384 | | | | |
| 16 | Image | Plano | — | | | | |

Note:
Reference wavelength is 587.6 nm (d-line).

TABLE 12

Aspheric Coefficients

| | Surface # | | | | | |
|---|---|---|---|---|---|---|
| | 1 | 2 | 4 | 5 | 6 | 7 |
| k = | 3.4697E−01 | −3.3909E+00 | −7.7390E+00 | 1.2478E+01 | 2.0000E+01 | 2.0000E+01 |
| A4 = | −6.2476E−02 | −3.3634E−01 | −4.0924E−02 | −1.7755E−01 | −2.8524E−01 | −1.0923E−01 |
| A6 = | 6.5784E−02 | 2.4942E−01 | −1.8887E−01 | −5.1679E−01 | −4.7835E−01 | 5.8081E−01 |
| A8 = | −3.8749E−01 | 3.2578E−01 | 4.2851E−01 | −6.5015E−01 | −1.6576E+00 | −3.4062E+00 |
| A10 = | 7.2325E−01 | −2.1086E−01 | 2.3433E+00 | 3.5393E+00 | −5.1907E−01 | 8.7443E+00 |
| A12 = | −8.5607E−01 | −1.7647E+00 | −8.9537E+00 | −9.4711E+00 | 4.3439E+00 | −1.1837E+01 |
| A14 = | 5.0198E−01 | 3.3146E+00 | 1.1443E+01 | 1.1007E+01 | 1.2657E+00 | 5.9517E+00 |

| | Surface # | | | | | |
|---|---|---|---|---|---|---|
| | 8 | 9 | 10 | 11 | 12 | 13 |
| k = | 2.5120E+00 | −2.4967E−01 | −6.6147E+00 | −2.4683E+00 | −2.8576E+01 | −6.6732E+00 |
| A4 = | 5.0852E−02 | −1.7781E−03 | 2.7557E−01 | −3.8514E−01 | −5.0735E−01 | −2.4873E−01 |
| A6 = | 5.3635E−01 | −6.7907E−01 | −1.9893E+00 | 1.9871E+00 | 2.9932E−01 | 1.6037E−01 |
| A8 = | 1.4124E+00 | 2.7922E+00 | 8.0609E+00 | −5.8350E+00 | −5.0191E−02 | −7.0133E−02 |
| A10 = | −3.2404E+00 | −5.1908E+00 | −2.3312E+01 | 9.0812E+00 | −1.0767E−02 | 1.7525E−02 |
| A12 = | −1.5876E+00 | 4.9727E+00 | 3.8387E+01 | −8.0229E+00 | 2.3767E−03 | −2.2951E−03 |
| A14 = | 7.2242E+00 | −1.4871E+00 | −3.3221E+01 | 3.7684E+00 | 2.2014E−03 | 1.1865E−04 |
| A16 = | −4.0324E+00 | | 1.1553E+01 | −7.2615E−01 | −8.9409E−04 | |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.68 | R12/f | 0.31 |
| Fno | 2.10 | f1/f2 | 1.37 |
| HFOV [deg.] | 40.2 | f4/f5 | −0.20 |
| V3 + V5 − V4 | −8.8 | f/f5 | −0.13 |
| T34/T45 | 1.19 | \|f/f1\| + \|f/f2\| | 0.90 |
| CT5/CT6 | 0.62 | \|Pmax\| | 0.64 |
| Td/CT6 | 6.09 | f/EPD | 2.10 |
| ΣCT/Td | 0.77 | SL/TL | 0.85 |
| f/R9 | −0.70 | TL/ImgH | 1.58 |

7th Embodiment

Figure 13:
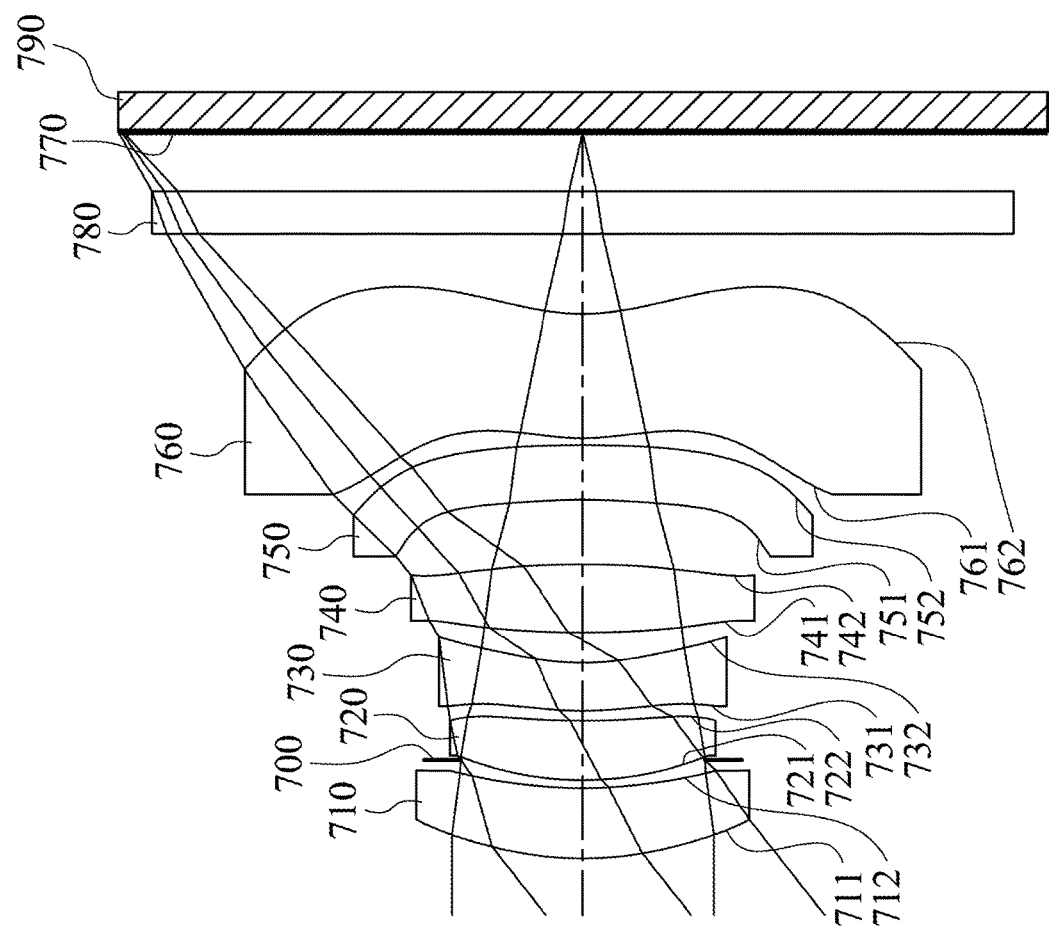
FIG. 13 is a schematic view of an image lens assembly according to the 7th embodiment of the present disclosure.
Figure 14:
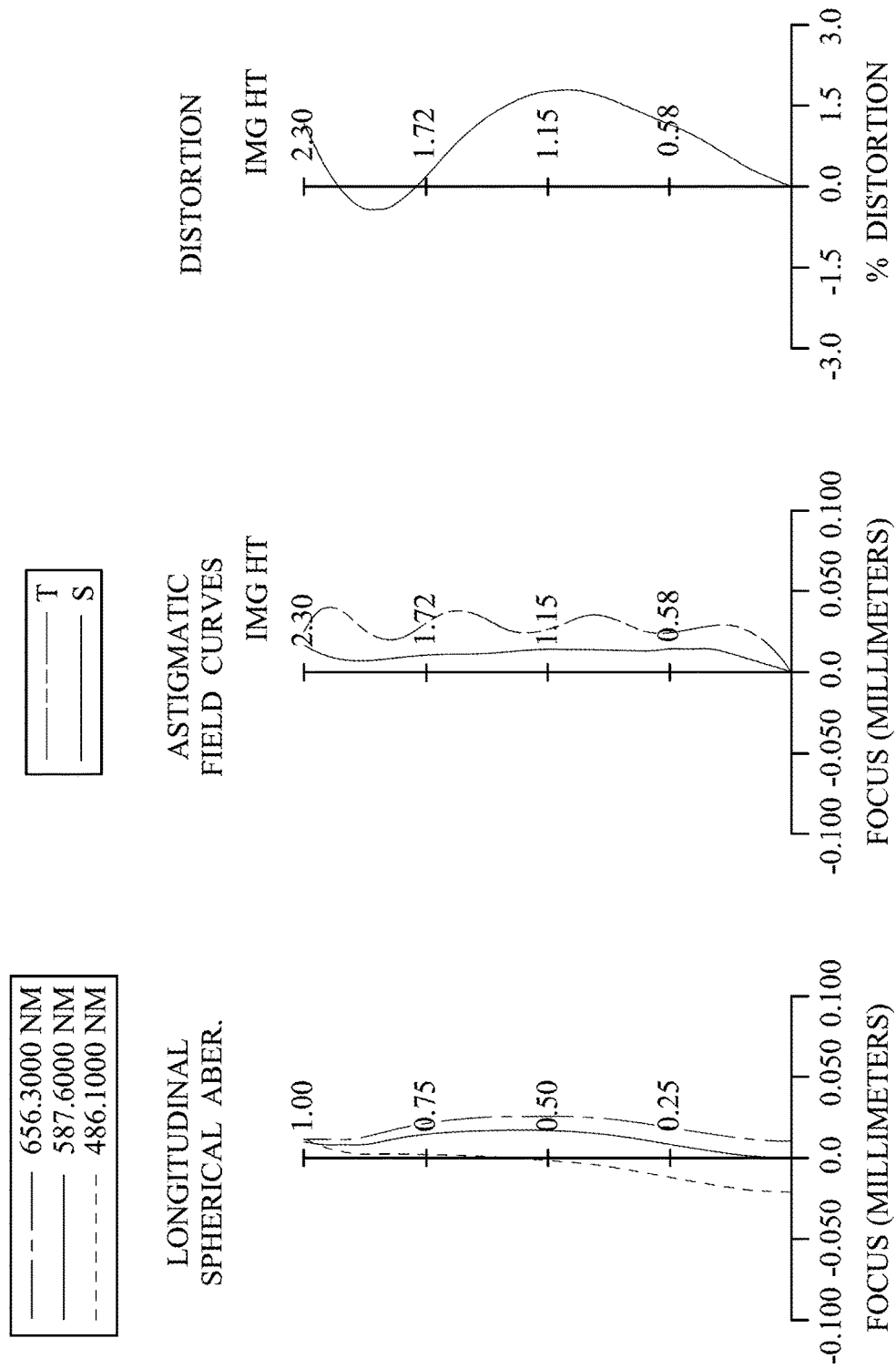
FIG. 14 shows, in order from left to right, spherical aberration curves, astigmatic field curves and a distortion curve of the image lens assembly according to the 7th embodiment.

FIG. 13 is a schematic view of an image lens assembly according to the 7th embodiment of the present disclosure. FIG. 14 shows, in order from left to right, spherical aberration curves, astigmatic field curves and a distortion curve of the image lens assembly according to the 7th embodiment.

In FIG. 13, the image lens assembly includes, in order from an object side to an image side, a first lens element 710, an aperture stop 700, a second lens element 720, a third lens element 730, a fourth lens element 740, a fifth lens element 750, a sixth lens element 760, an IR-cut filter 780, an image plane 770 and an image sensor 790, wherein the image lens assembly has a total of six lens elements (710-760) with refractive power.

The first lens element 710 with positive refractive power has a convex object-side surface 711 and a concave image-side surface 712, which are both aspheric, and the first lens element 710 is made of glass material.

The second lens element 720 with positive refractive power has a convex object-side surface 721 and a concave image-side surface 722, which are both aspheric, and the second lens element 720 is made of plastic material.

The third lens element 730 with negative refractive power has a convex object-side surface 731 and a concave image-side surface 732, which are both aspheric, and the third lens element 730 is made of plastic material.

The fourth lens element 740 with positive refractive power has a convex object-side surface 741 and a convex image-side surface 742, which are both aspheric, and the fourth lens element 740 is made of plastic material.

The fifth lens element 750 with negative refractive power has a concave object-side surface 751 and a convex image-side surface 752, which are both aspheric, and the fifth lens element 750 is made of plastic material.

The sixth lens element 760 with positive refractive power has a convex object-side surface 761 and a concave image-side surface 762, which are both aspheric, and the sixth lens element 760 is made of plastic material. Moreover, the image-side surface 762 of the sixth lens element 760 has at least one inflection point.

The IR-cut filter 780 is made of glass and located between the sixth lens element 760 and the image plane 770, and will not affect the focal length of the image lens assembly.

The detailed optical data of the 7th embodiment are shown in Table 13 and the aspheric surface data are shown in Table 14 below.

TABLE 13

7th Embodiment
f = 2.87 mm, Fno = 2.20, HFOV = 38.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.690 | ASP | 0.350 | Glass | 1.603 | 38.0 | 9.22 |
| 2 | | 2.239 | ASP | 0.140 | | | | |
| 3 | Ape. Stop | Plano | | −0.100 | | | | |
| 4 | Lens 2 | 1.725 | ASP | 0.295 | Plastic | 1.544 | 55.9 | 5.71 |
| 5 | | 3.638 | ASP | 0.050 | | | | |
| 6 | Lens 3 | 1.891 | ASP | 0.240 | Plastic | 1.639 | 23.5 | −11.25 |
| 7 | | 1.423 | ASP | 0.152 | | | | |
| 8 | Lens 4 | 5.653 | ASP | 0.340 | Plastic | 1.530 | 55.8 | 4.53 |
| 9 | | −4.093 | ASP | 0.321 | | | | |
| 10 | Lens 5 | −2.659 | ASP | 0.271 | Plastic | 1.650 | 21.4 | −5.87 |
| 11 | | −9.136 | ASP | 0.035 | | | | |
| 12 | Lens 6 | 1.188 | ASP | 0.621 | Plastic | 1.535 | 55.7 | 23.01 |
| 13 | | 1.076 | ASP | 0.400 | | | | |
| 14 | IR-cut filter | Plano | | 0.210 | Glass | 1.517 | 64.2 | — |
| 15 | | Plano | | 0.295 | | | | |
| 16 | Image | Plano | | — | | | | |

Note:
Reference wavelength is 587.6 nm (d-line).

TABLE 14

Aspheric Coefficients

| Surface # | | | | | |
|---|---|---|---|---|---|
| 1 | 2 | 4 | 5 | 6 | 7 |
| k = −1.1309E−01 | 5.7714E+00 | 2.7590E+00 | −1.6899E+01 | −3.7395E+00 | −5.9360E+00 |
| A4 = −8.2804E−02 | −1.4747E−01 | 5.2184E−02 | −9.7362E−02 | −4.5704E−01 | −9.5803E−02 |
| A6 = 5.9853E−02 | −4.2938E−01 | −3.8874E−01 | 1.3827E−01 | 8.6975E−02 | 2.6059E−01 |
| A8 = −3.0258E−01 | 1.1543E+00 | −5.4972E−02 | −2.7835E+00 | −6.6119E−01 | −2.7312E+00 |
| A10 = 8.4371E−01 | 1.8512E+00 | 2.1456E+00 | 4.0605E+00 | −1.7108E+00 | 1.0185E+01 |
| A12 = −8.1464E−01 | −2.9735E+00 | −2.7058E+00 | 1.2499E+00 | 1.1536E+01 | −1.6336E+01 |
| A14 = 2.9344E−01 | 2.5139E+00 | −2.7188E+00 | −5.9124E+00 | −1.0592E+01 | 1.0784E+01 |

| Surface # | | | | | |
|---|---|---|---|---|---|
| 8 | 9 | 10 | 11 | 12 | 13 |
| k = 1.8430E+01 | −2.3484E+01 | −4.3093E+01 | −1.0000E+00 | −2.0361E+01 | −5.7376E+00 |
| A4 = 5.5964E−02 | 3.4542E−02 | 4.7119E−01 | −4.0546E−01 | −5.7968E−01 | −2.5417E−01 |
| A6 = −1.9800E−01 | −6.6678E−01 | −2.5723E+00 | 1.8772E+00 | 3.0427E−01 | 1.5164E−01 |
| A8 = 1.3410E+00 | 2.6922E+00 | 8.4665E+00 | −5.5922E+00 | −5.9857E−02 | −6.1027E−02 |
| A10 = −3.2194E+00 | −5.0499E+00 | −2.2554E+01 | 9.0062E+00 | 5.9024E−03 | 8.7582E−03 |
| A12 = 8.0766E−02 | 5.1250E+00 | 3.7861E+01 | −8.1076E+00 | 6.7336E−03 | 4.9373E−04 |

TABLE 14-continued

| Aspheric Coefficients | | | | | |
|---|---|---|---|---|---|
| A14 = | 8.5715E+00 | −2.1027E+00 | −3.4699E+01 | 3.7736E+00 | 3.6871E−04 | −1.2638E−04 |
| A16 = | −8.7905E+00 | | 1.2833E+01 | −7.0207E−01 | −1.7389E−03 | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.87 | R12/f | 0.37 |
| Fno | 2.20 | f1/f2 | 1.61 |
| HFOV [deg.] | 38.3 | f4/f5 | −0.77 |
| V3 + V5 − V4 | −10.9 | f/f5 | −0.49 |
| T34/T45 | 0.47 | |f/f1| + |f/f2| | 0.81 |
| CT5/CT6 | 0.44 | |Pmax| | 0.63 |
| Td/CT6 | 4.37 | f/EPD | 2.20 |
| ΣCT/Td | 0.78 | SL/TL | 0.86 |
| f/R9 | −1.08 | TL/ImgH | 1.57 |

8th Embodiment

Figure 15:
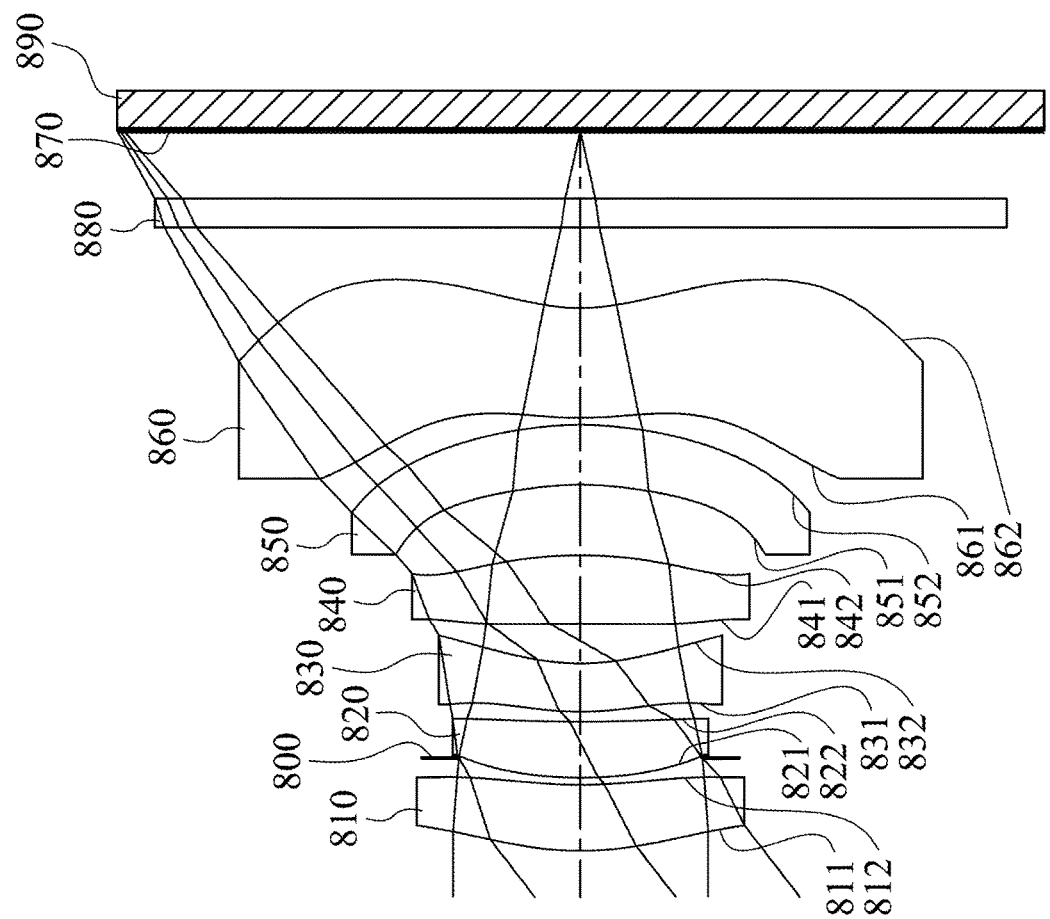
FIG. 15 is a schematic view of an image lens assembly according to the 8th embodiment of the present disclosure.
Figure 16:
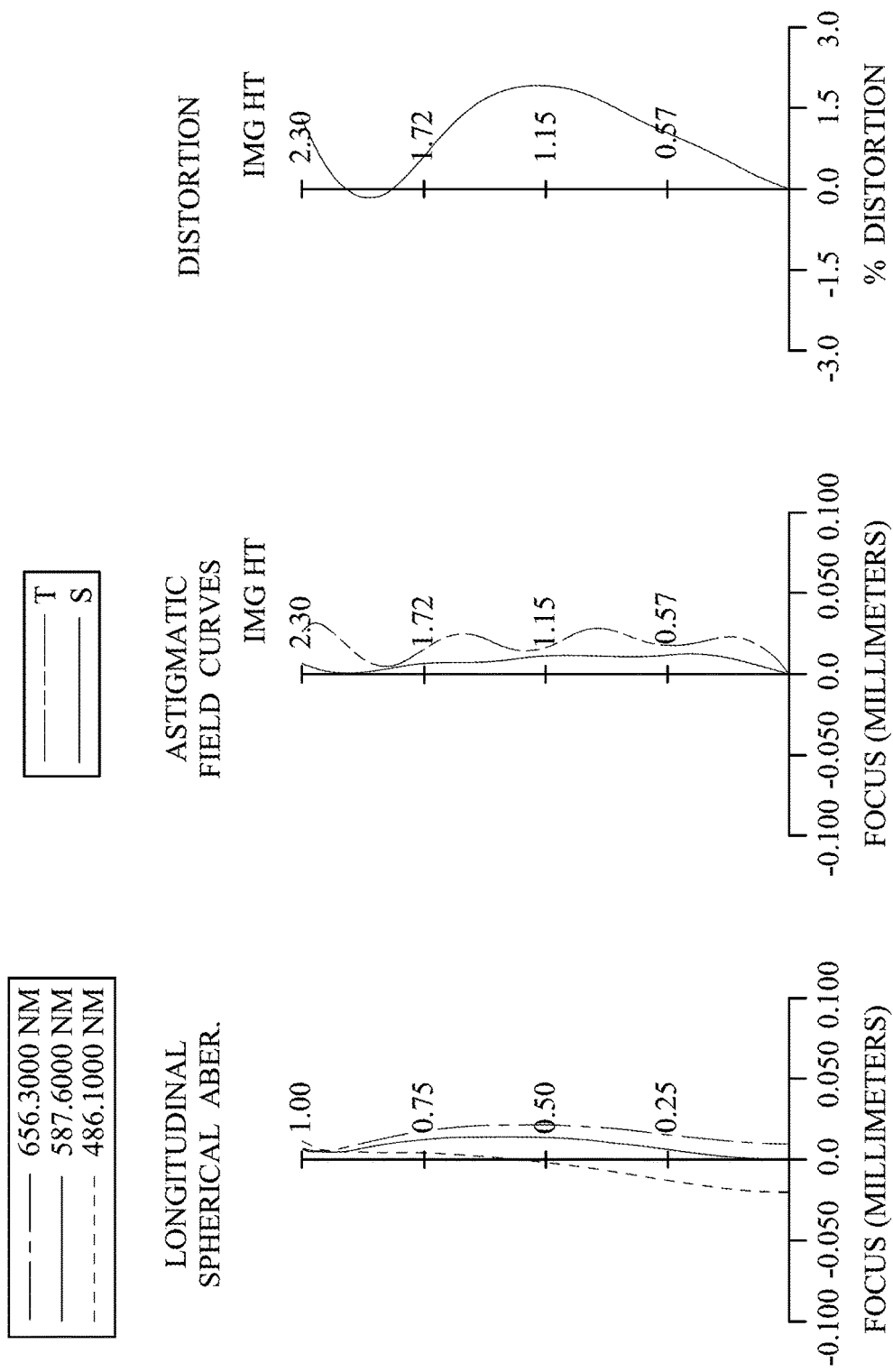
FIG. 16 shows, in order from left to right, spherical aberration curves, astigmatic field curves and a distortion curve of the image lens assembly according to the 8th embodiment.

FIG. 15 is a schematic view of an image lens assembly according to the 8th embodiment of the present disclosure. FIG. 16 shows, in order from left to right, spherical aberration curves, astigmatic field curves and a distortion curve of the image lens assembly according to the 8th embodiment.

In FIG. 15, the image lens assembly includes, in order from an object side to an image side, a first lens element 810, an aperture stop 800, a second lens element 820, a third lens element 830, a fourth lens element 840, a fifth lens element 850, a sixth lens element 860, an IR-cut filter 880, an image plane 870 and an image sensor 890, wherein the image lens assembly has a total of six lens elements (810-860) with refractive power.

The first lens element 810 with positive refractive power has a convex object-side surface 811 and a concave image-side surface 812, which are both aspheric, and the first lens element 810 is made of plastic material.

The second lens element 820 with positive refractive power has a convex object-side surface 821 and a concave image-side surface 822, which are both aspheric, and the second lens element 820 is made of plastic material.

The third lens element 830 with negative refractive power has a convex object-side surface 831 and a concave image-side surface 832, which are both aspheric, and the third lens element 830 is made of plastic material.

The fourth lens element 840 with positive refractive power has a concave object-side surface 841 and a convex image-side surface 842, which are both aspheric, and the fourth lens element 840 is made of plastic material.

The fifth lens element 850 with negative refractive power has a concave object-side surface 851 and a convex image-side surface 852, which are both aspheric, and the fifth lens element 850 is made of plastic material.

The sixth lens element 860 with negative refractive power has a convex object-side surface 861 and a concave image-side surface 862, which are both aspheric, and the sixth lens element 860 is made of plastic material. Moreover, the image-side surface 862 of the sixth lens element 860 has at least one inflection point.

The IR-cut filter 880 is made of glass and located between the sixth lens element 860 and the image plane 870, and will not affect the focal length of the image lens assembly.

The detailed optical data of the 8th embodiment are shown in Table 15 and the aspheric surface data are shown in Table 16 below.

TABLE 15

8th Embodiment
f = 2.93 mm, Fno = 2.30, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.654 | ASP | 0.328 | Plastic | 1.535 | 56.3 | 8.78 |
| 2 | | 2.378 | ASP | 0.135 | | | | |
| 3 | Ape. Stop | Plano | | −0.100 | | | | |
| 4 | Lens 2 | 1.984 | ASP | 0.280 | Plastic | 1.544 | 55.9 | 4.48 |
| 5 | | 10.102 | ASP | 0.050 | | | | |
| 6 | Lens 3 | 1.673 | ASP | 0.240 | Plastic | 1.639 | 23.5 | −9.12 |
| 7 | | 1.227 | ASP | 0.200 | | | | |
| 8 | Lens 4 | −22.124 | ASP | 0.342 | Plastic | 1.530 | 55.8 | 4.40 |
| 9 | | −2.119 | ASP | 0.351 | | | | |
| 10 | Lens 5 | −1.574 | ASP | 0.298 | Plastic | 1.650 | 21.4 | −22.79 |
| 11 | | −1.893 | ASP | 0.035 | | | | |
| 12 | Lens 6 | 1.743 | ASP | 0.551 | Plastic | 1.535 | 55.7 | −5.95 |
| 13 | | 1.002 | ASP | 0.400 | | | | |

TABLE 15-continued

8th Embodiment
f = 2.93 mm, Fno = 2.30, HFOV = 37.7 deg.

| Surface # | | Curvature Radius | Thickness | Material | Index | Abbe # | Focal Length |
|---|---|---|---|---|---|---|---|
| 14 | IR-cut filter | Plano | 0.145 | Glass | 1.517 | 64.2 | — |
| 15 | | Plano | 0.340 | | | | |
| 16 | Image | Plano | — | | | | |

Note:
Reference wavelength is 587.6 nm (d-line).

TABLE 16

Aspheric Coefficients

| Surface # | | | | | | |
|---|---|---|---|---|---|---|
| | 1 | 2 | 4 | 5 | 6 | 7 |
| k = | −1.5523E+00 | −5.9540E+00 | 3.3076E+00 | −6.2567E+00 | −2.0859E+00 | −3.4971E+00 |
| A4 = | −1.2458E−01 | −2.4774E−01 | 5.5346E−02 | 3.9079E−02 | −4.3556E−01 | −1.1844E−01 |
| A6 = | −3.1126E−02 | −4.0416E−01 | −2.4096E−01 | 2.2635E−01 | −1.6282E−02 | 2.1052E−01 |
| A8 = | −3.1958E−01 | 1.3576E+00 | 3.0831E−01 | −2.3247E+00 | −9.1492E−01 | −2.7519E+00 |
| A10 = | 8.6527E−01 | 1.3522E−01 | 1.9566E+00 | 4.0103E+00 | −1.1127E+00 | 9.8667E+00 |
| A12 = | −8.0000E−01 | −3.8953E+00 | −4.4133E+00 | −1.2530E+00 | 1.0512E+01 | −1.5998E+01 |
| A14 = | 2.4605E−01 | 3.4663E+00 | 1.9240E+00 | −1.0644E+00 | −9.4051E+00 | 1.0830E+01 |

| Surface # | | | | | | |
|---|---|---|---|---|---|---|
| | 8 | 9 | 10 | 11 | 12 | 13 |
| k = | −6.0751E+01 | −1.1654E+00 | −9.3926E+00 | −3.6114E+01 | −3.6306E+01 | −6.7479E+00 |
| A4 = | 8.5888E−02 | 4.5497E−02 | 3.6404E−01 | −5.6605E−01 | −5.2148E−01 | −2.2968E−01 |
| A6 = | −1.7640E−02 | −5.1903E−01 | −2.4955E+00 | 2.0714E+00 | 3.0761E−01 | 1.3984E−01 |
| A8 = | 1.4117E+00 | 2.6879E+00 | 8.6608E+00 | −5.6365E+00 | −6.6314E−02 | −5.8197E−02 |
| A10 = | −3.3976E+00 | −5.0100E+00 | −2.2681E+01 | 8.9988E+00 | 1.0139E−04 | 8.8858E−03 |
| A12 = | −2.6092E−01 | 5.2499E+00 | 3.7760E+01 | −8.1030E+00 | 3.8114E−03 | 2.8230E−04 |
| A14 = | 8.5725E+00 | −2.3536E+00 | −3.4557E+01 | 3.7721E+00 | 2.6030E−04 | −1.0305E−04 |
| A16 = | −8.3759E+00 | | 1.2790E+01 | −7.0561E−01 | −5.0645E−04 | |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.93 | R12/f | 0.34 |
| Fno | 2.30 | f1/f2 | 1.96 |
| HFOV [deg.] | 37.7 | f4/f5 | −0.19 |
| V3 + V5 − V4 | −10.9 | f/f5 | −0.13 |
| T34/T45 | 0.57 | |f/f1| + |f/f2| | 0.99 |
| CT5/CT6 | 0.54 | |Pmax| | 0.67 |
| Td/CT6 | 4.92 | f/EPD | 2.30 |
| ΣCT/Td | 0.75 | SL/TL | 0.87 |
| f/R9 | −1.86 | TL/ImgH | 1.56 |

9th Embodiment

Figure 17:
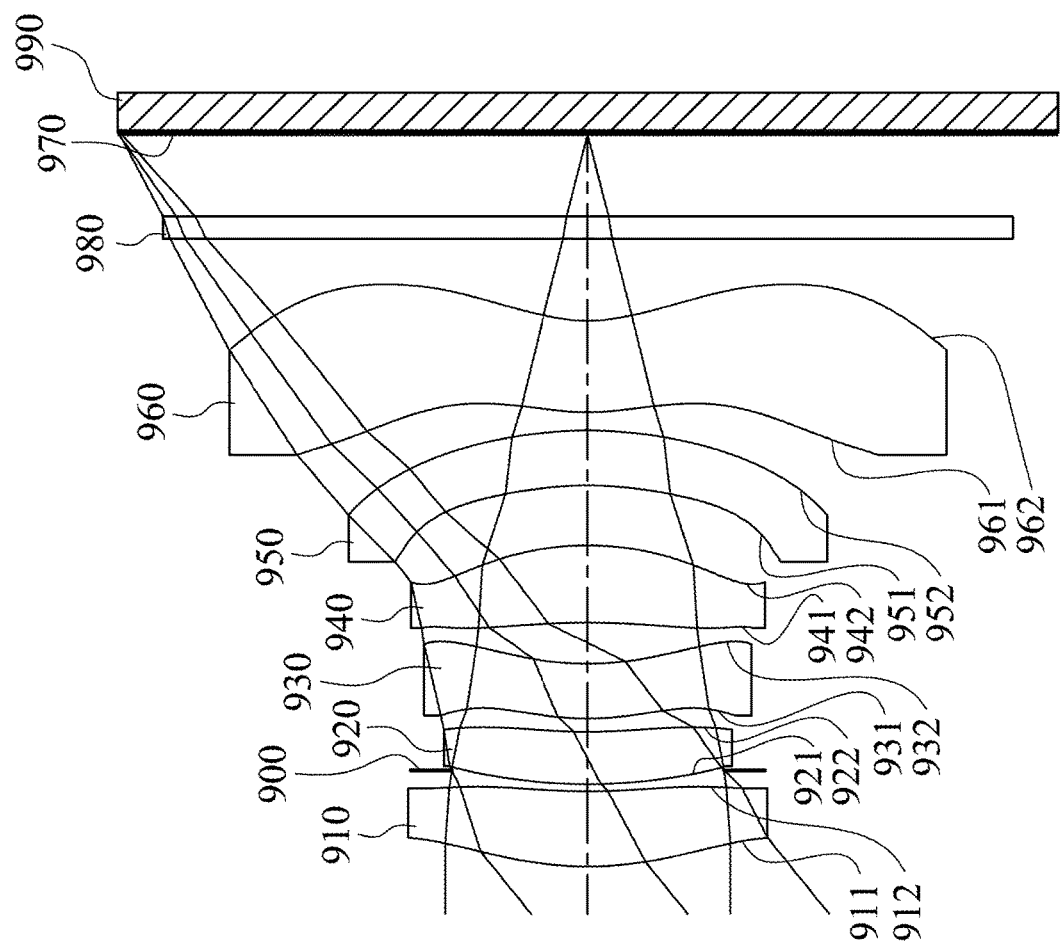
FIG. 17 is a schematic view of an image lens assembly according to the 9th embodiment of the present disclosure.
Figure 18:
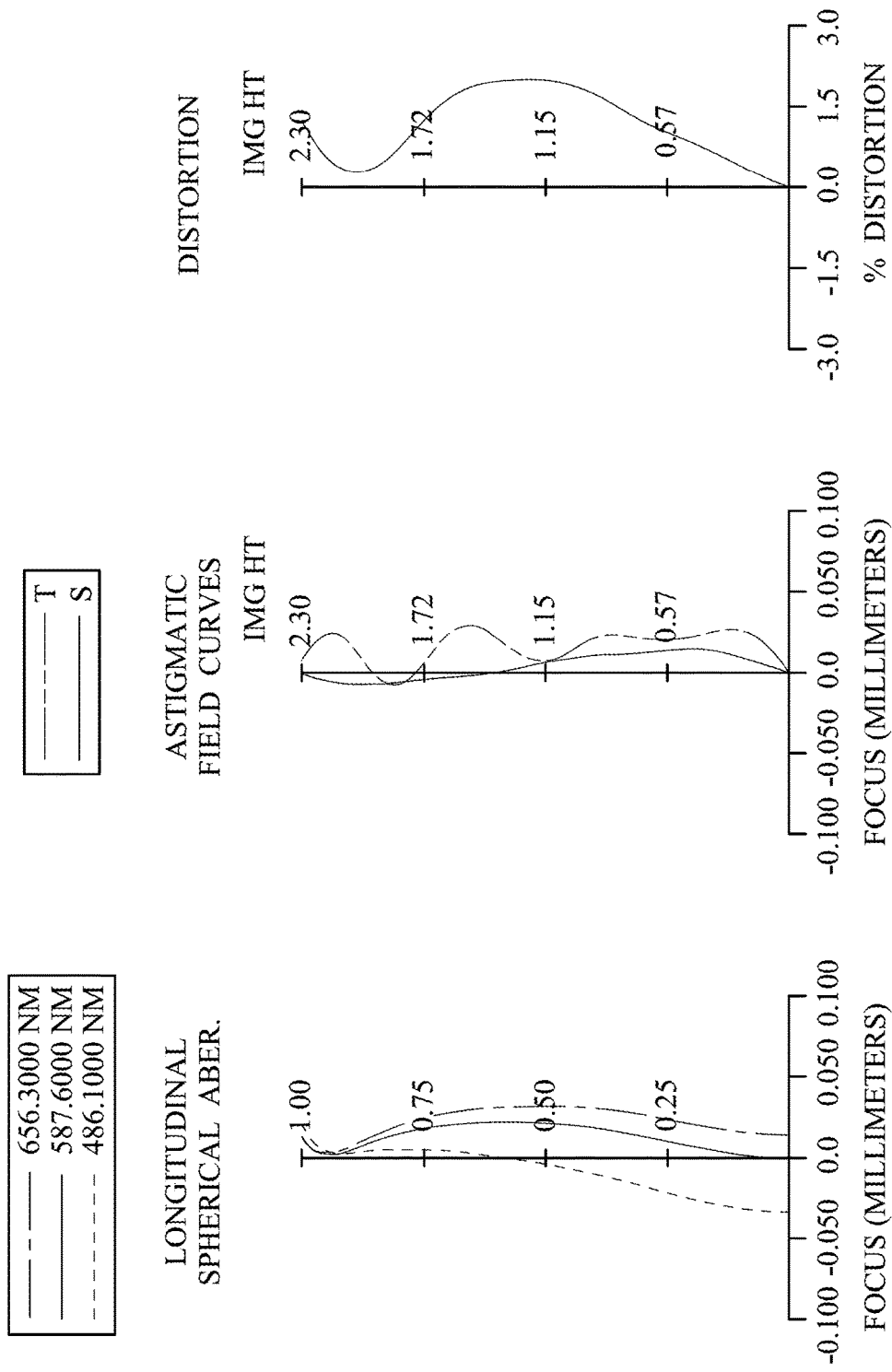
FIG. 18 shows, in order from left to right, spherical aberration curves, astigmatic field curves and a distortion curve of the image lens assembly according to the 9th embodiment.

FIG. 17 is a schematic view of an image lens assembly according to the 9th embodiment of the present disclosure. FIG. 18 shows, in order from left to right, spherical aberration curves, astigmatic field curves and a distortion curve of the image lens assembly according to the 9th embodiment.

In FIG. 17, the image lens assembly includes, in order from an object side to an image side, a first lens element 910, an aperture stop 900, a second lens element 920, a third lens element 930, a fourth lens element 940, a fifth lens element 950, a sixth lens element 960, an IR-cut filter 980, an image plane 970 and an image sensor 990, wherein the image lens assembly has a total of six lens elements (910-960) with refractive power.

The first lens element 910 with positive refractive power has a convex object-side surface 911 and a concave image-side surface 912, which are both aspheric, and the first lens element 910 is made of plastic material.

The second lens element 920 with positive refractive power has a convex object-side surface 921 and a concave image-side surface 922, which are both aspheric, and the second lens element 920 is made of plastic material.

The third lens element 930 with positive refractive power has a convex object-side surface 931 and a concave image-side surface 932, which are both aspheric, and the third lens element 930 is made of plastic material.

The fourth lens element 940 with positive refractive power has a concave object-side surface 941 and a convex image-side surface 942, which are both aspheric, and the fourth lens element 940 is made of plastic material.

The fifth lens element 950 with negative refractive power has a concave object-side surface 951 and a convex image-side surface 952, which are both aspheric, and the fifth lens element 950 is made of plastic material.

The sixth lens element 960 with negative refractive power has a convex object-side surface 961 and a concave image-side surface 962, which are both aspheric, and the sixth lens element 960 is made of plastic material. Moreover, the image-side surface 962 of the sixth lens element 960 has at least one inflection point.

The IR-cut filter 980 is made of glass and located between the sixth lens element 960 and the image plane 970, and will not affect the focal length of the image lens assembly.

The detailed optical data of the 9th embodiment are shown in Table 17 and the aspheric surface data are shown in Table 18 below.

TABLE 17

9th Embodiment
f = 2.79 mm, Fno = 2.00, HFOV = 39.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.693 | ASP | 0.367 | Plastic | 1.535 | 56.3 | 6.90 |
| 2 | | 2.894 | ASP | 0.103 | | | | |
| 3 | Ape. Stop | Plano | | −0.068 | | | | |
| 4 | Lens 2 | 2.476 | ASP | 0.258 | Plastic | 1.544 | 55.9 | 15.77 |
| 5 | | 3.352 | ASP | 0.064 | | | | |
| 6 | Lens 3 | 1.425 | ASP | 0.267 | Plastic | 1.639 | 23.5 | 23.16 |
| 7 | | 1.462 | ASP | 0.204 | | | | |
| 8 | Lens 4 | −3.968 | ASP | 0.378 | Plastic | 1.530 | 55.8 | 4.03 |
| 9 | | −1.434 | ASP | 0.293 | | | | |
| 10 | Lens 5 | −1.668 | ASP | 0.269 | Plastic | 1.614 | 25.6 | −15.29 |
| 11 | | −2.154 | ASP | 0.089 | | | | |
| 12 | Lens 6 | 1.227 | ASP | 0.450 | Plastic | 1.535 | 55.7 | −7.46 |
| 13 | | 0.818 | ASP | 0.400 | | | | |
| 14 | IR-cut filter | Plano | | 0.110 | Glass | 1.517 | 64.2 | — |
| 15 | | Plano | | 0.409 | | | | |
| 16 | Image | Plano | | — | | | | |

Note:
Reference wavelength is 587.6 nm (d-line).

TABLE 18

Aspheric Coefficients

| | Surface # | | | | | |
|---|---|---|---|---|---|---|
| | 1 | 2 | 4 | 5 | 6 | 7 |
| k = | −8.4929E−01 | −7.2264E+00 | −3.0669E+00 | −2.9049E+01 | −2.1037E+00 | −1.3655E+00 |
| A4 = | −1.0388E−01 | −2.6015E−01 | 1.9847E−04 | −1.5477E−01 | −4.4552E−01 | −1.0692E−01 |
| A6 = | 3.2837E−02 | −4.6844E−01 | −3.7348E−01 | 8.6446E−02 | −2.1279E−01 | 5.7768E−02 |
| A8 = | −4.5857E−01 | 1.4128E+00 | 5.7214E−01 | −1.5480E+00 | −1.1731E+00 | −3.0521E+00 |
| A10 = | 8.3201E−01 | 2.1634E−01 | 2.4641E+00 | 3.4355E+00 | 3.7018E−01 | 1.0008E+01 |
| A12 = | −7.5385E−01 | −3.7016E+00 | −6.3929E+00 | −3.4714E+00 | 5.8355E+00 | −1.3385E+01 |
| A14 = | 3.1970E−01 | 3.2068E+00 | 4.6229E+00 | 2.6868E+00 | −4.8722E+00 | 6.1135E+00 |

| | Surface # | | | | | |
|---|---|---|---|---|---|---|
| | 8 | 9 | 10 | 11 | 12 | 13 |
| k = | 7.4059E+00 | 7.2242E−02 | −7.9163E+00 | −3.9425E+01 | −1.8289E+01 | −5.6714E+00 |
| A4 = | 6.9639E−02 | 2.7215E−02 | 3.4624E−01 | −5.6862E−01 | −4.8661E−01 | −2.4421E−01 |
| A6 = | −4.1058E−02 | −5.2780E−01 | −2.3406E+00 | 2.1777E+00 | 3.1370E−01 | 1.5715E−01 |
| A8 = | 1.9032E+00 | 2.5752E+00 | 8.4986E+00 | −5.7763E+00 | −6.8242E−02 | −6.4721E−02 |
| A10 = | −3.4299E+00 | −4.9078E+00 | −2.2947E+01 | 9.0096E+00 | −3.4123E−03 | 1.0999E−02 |
| A12 = | −1.0760E+00 | 5.5839E+00 | 3.8021E+01 | −8.0518E+00 | 2.5436E−03 | 2.2042E−04 |
| A14 = | 8.5057E+00 | −2.4090E+00 | −3.3948E+01 | 3.7858E+00 | 3.8527E−04 | −1.8541E−04 |
| A16 = | −7.2260E+00 | | 1.2180E+01 | −7.2473E−01 | −2.2197E−04 | |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.79 | R12/f | 0.29 |
| Fno | 2.00 | f1/f2 | 0.44 |
| HFOV [deg.] | 39.0 | f4/f5 | −0.26 |
| V3 + V5 − V4 | −6.7 | f/f5 | −0.18 |
| T34/T45 | 0.70 | \|f/f1\| + \|f/f2\| | 0.58 |
| CT5/CT6 | 0.60 | \|Pmax\| | 0.69 |
| Td/CT6 | 5.94 | f/EPD | 2.00 |
| ΣCT/Td | 0.74 | SL/TL | 0.87 |
| f/R9 | −1.67 | TL/ImgH | 1.56 |

10th Embodiment

Figure 19:
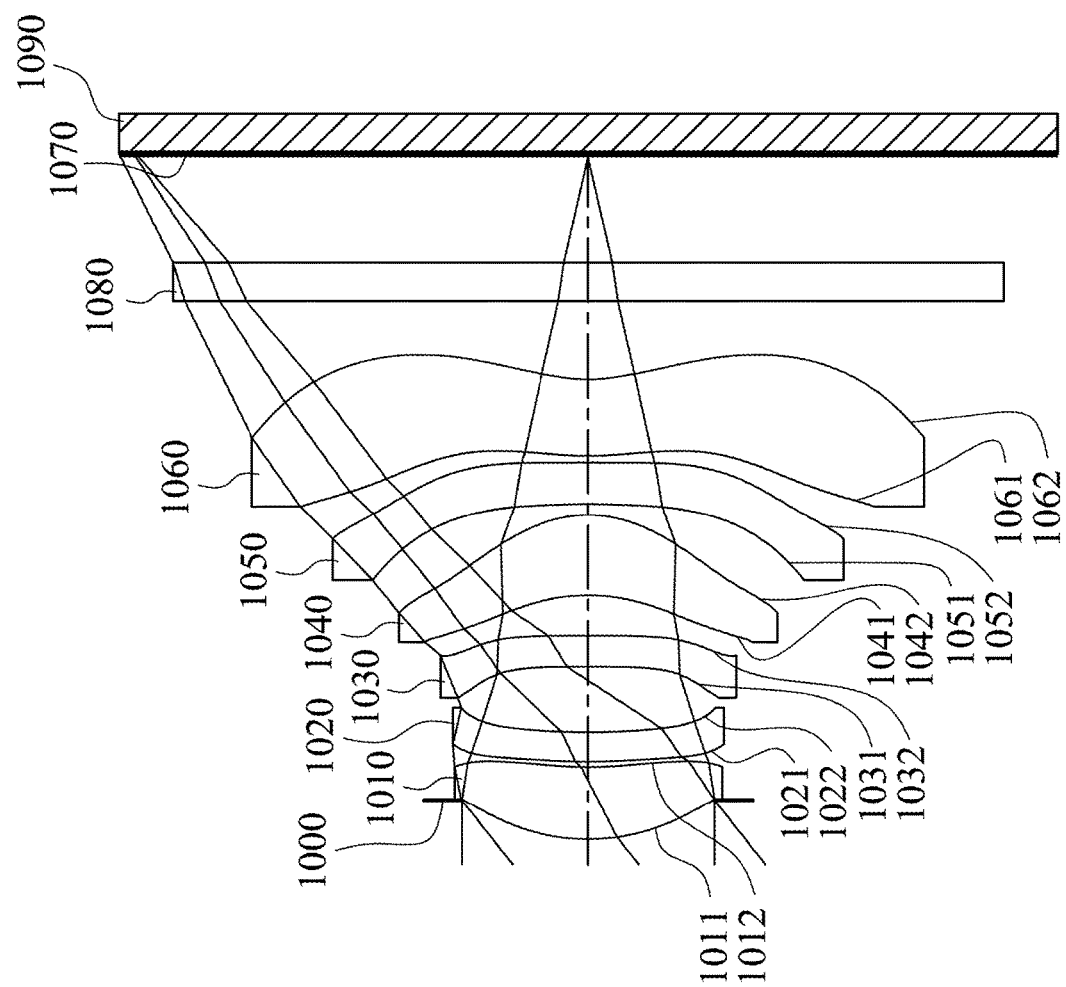
FIG. 19 is a schematic view of an image lens assembly according to the 10th embodiment of the present disclosure.
Figure 20:
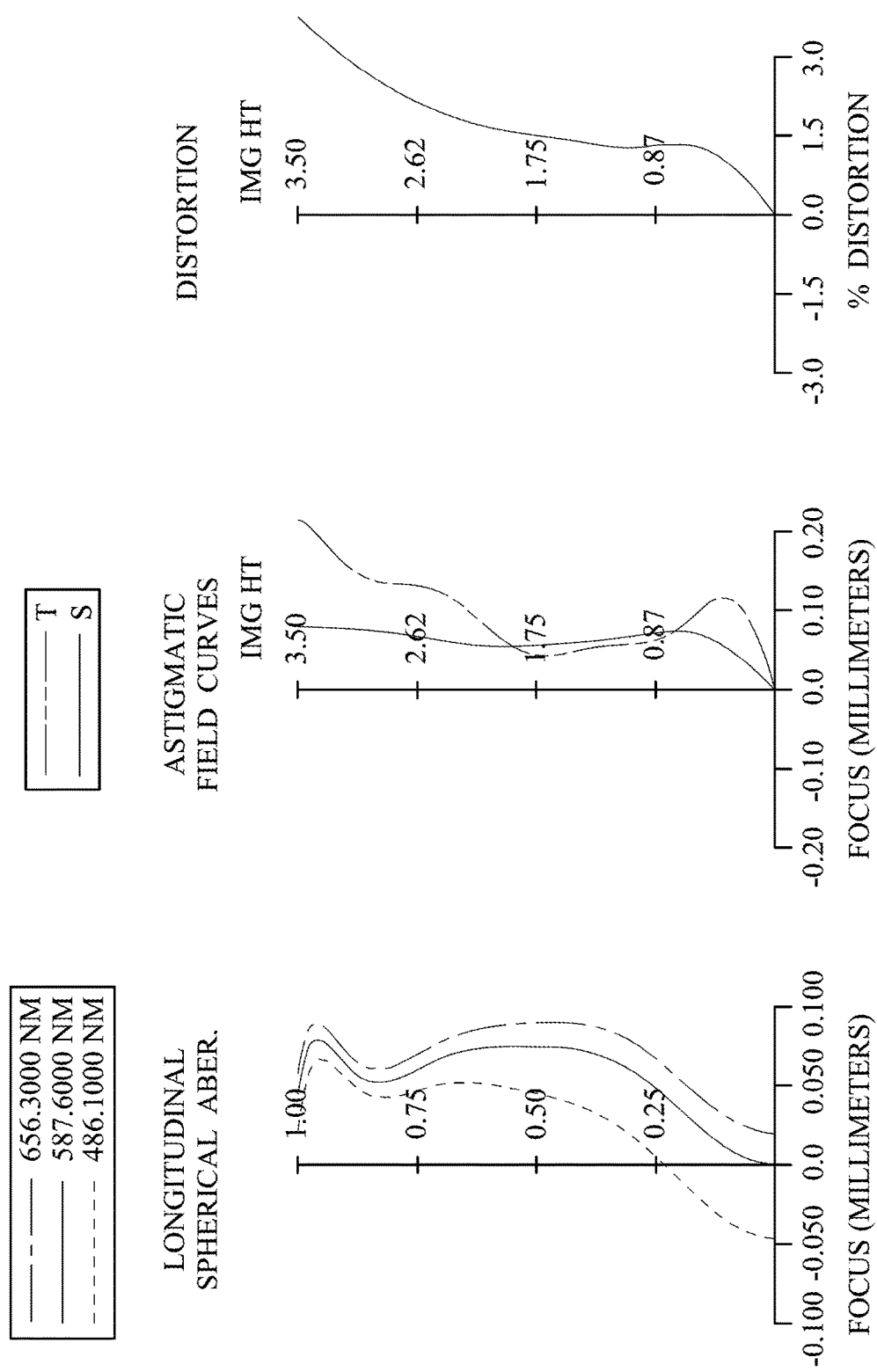
FIG. 20 shows, in order from left to right, spherical aberration curves, astigmatic field curves and a distortion curve of the image lens assembly according to the 10th embodiment.

FIG. 19 is a schematic view of an image lens assembly according to the 10th embodiment of the present disclosure. FIG. 20 shows, in order from left to right, spherical aberration curves, astigmatic field curves and a distortion curve of the image lens assembly according to the 10th embodiment.

In FIG. 19, the image lens assembly includes, in order from an object side to an image side, an aperture stop 1000, a first lens element 1010, a second lens element 1020, a third lens element 1030, a fourth lens element 1040, a fifth lens element 1050, a sixth lens element 1060, an IR-cut filter 1080, an image plane 1070 and an image sensor 1090, wherein the image lens assembly has a total of six lens elements (1010-1060) with refractive power.

The first lens element 1010 with positive refractive power has a convex object-side surface 1011 and a concave image-side surface 1012, which are both aspheric, and the first lens element 1010 is made of plastic material.

The second lens element 1020 with positive refractive power has a convex object-side surface 1021 and a concave image-side surface 1022, which are both aspheric, and the second lens element 1020 is made of plastic material.

The third lens element 1030 with negative refractive power has a concave object-side surface 1031 and a convex image-side surface 1032, which are both aspheric, and the third lens element 1030 is made of plastic material.

The fourth lens element 1040 with positive refractive power has a concave object-side surface 1041 and a convex image-side surface 1042, which are both aspheric, and the fourth lens element 1040 is made of plastic material.

The fifth lens element 1050 with negative refractive power has a concave object-side surface 1051 and a concave image-side surface 1052, which are both aspheric, and the fifth lens element 1050 is made of plastic material.

The sixth lens element 1060 with negative refractive power has a convex object-side surface 1061 and a concave image-side surface 1062, which are both aspheric, and the sixth lens element 1060 is made of plastic material. Moreover, the image-side surface 1062 of the sixth lens element 1060 has at least one inflection point.

The IR-cut filter 1080 is made of glass and located between the sixth lens element 1060 and the image plane 1070, and will not affect the focal length of the image lens assembly.

The detailed optical data of the 10th embodiment are shown in Table 19 and the aspheric surface data are shown in Table 20 below.

TABLE 19

10th Embodiment
f = 4.24 mm, Fno = 2.18, HFOV = 38.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.300 | | | | |
| 2 | Lens 1 | 1.567 | ASP | 0.559 | Plastic | 1.544 | 55.9 | 5.19 |
| 3 | | 3.076 | ASP | 0.042 | | | | |
| 4 | Lens 2 | 4.542 | ASP | 0.226 | Plastic | 1.650 | 21.4 | 31.58 |
| 5 | | 5.719 | ASP | 0.503 | | | | |
| 6 | Lens 3 | −93.000 | ASP | 0.240 | Plastic | 1.614 | 25.6 | −379.10 |
| 7 | | −155.000 | ASP | 0.311 | | | | |
| 8 | Lens 4 | −1.410 | ASP | 0.620 | Plastic | 1.544 | 55.9 | 3.75 |
| 9 | | −0.963 | ASP | 0.086 | | | | |
| 10 | Lens 5 | −6.312 | ASP | 0.320 | Plastic | 1.634 | 23.8 | −9.61 |
| 11 | | 177.000 | ASP | 0.051 | | | | |
| 12 | Lens 6 | 2.384 | ASP | 0.589 | Plastic | 1.535 | 55.7 | −6.44 |
| 13 | | 1.287 | ASP | 0.600 | | | | |
| 14 | IR-cut filter | Plano | | 0.300 | Glass | 1.517 | 64.2 | — |
| 15 | | Plano | | 0.840 | | | | |
| 16 | Image | Plano | | — | | | | |

Note:
Reference wavelength is 587.6 nm (d-line).

TABLE 20

Aspheric Coefficients

| | \multicolumn{6}{c}{Surface #} | | | | | |
|---|---|---|---|---|---|---|
| | 2 | 3 | 4 | 5 | 6 | 7 |
| k = | 1.0074E+00 | −1.2472E+01 | −2.0000E+01 | −1.3521E+01 | −7.6774E+00 | −2.0000E+01 |
| A4 = | −4.8528E−02 | −1.4008E−01 | −1.5715E−01 | −2.4684E−01 | −1.5240E−01 | −9.4759E−02 |
| A6 = | 4.1283E−02 | 2.3698E−02 | 1.7977E−01 | 1.1640E−01 | −3.1034E−01 | −2.1200E−01 |
| A8 = | −2.1040E−01 | 2.1155E−01 | 2.0588E−01 | 2.0905E−01 | 8.6680E−01 | 5.8060E−01 |
| A10 = | 2.5945E−01 | −4.5253E−01 | −6.5580E−01 | −6.7862E−01 | −1.9898E+00 | −1.0286E+00 |
| A12 = | −1.6567E−01 | 3.2434E−01 | 6.5102E−01 | 7.6088E−01 | 2.0484E+00 | 9.3308E−01 |
| A14 = | −5.9039E−03 | −8.6034E−02 | −2.1035E−01 | −2.5157E−01 | −7.0658E−01 | −3.4920E−01 |
| A16 = | | | | | 1.5015E−02 | 3.9843E−02 |

| | \multicolumn{6}{c}{Surface #} | | | | | |
|---|---|---|---|---|---|---|
| | 8 | 9 | 10 | 11 | 12 | 13 |
| k = | −4.9300E+00 | −1.3143E+00 | −1.1064E+00 | −1.5351E+01 | −6.6095E+01 | −1.0483E+01 |
| A4 = | −1.5188E−01 | −3.3776E−02 | 9.0424E−03 | −5.2301E−02 | −7.2967E−02 | −5.9824E−02 |
| A6 = | 2.0738E−01 | 1.9571E−01 | −5.6054E−02 | −3.9899E−02 | −3.1060E−02 | 1.4031E−02 |
| A8 = | −7.9702E−02 | −3.8162E−01 | 1.9960E−02 | 2.7397E−02 | 3.0432E−02 | −1.6866E−03 |
| A10 = | 1.8006E−02 | 4.4027E−01 | −2.8929E−03 | −8.6901E−03 | −8.4011E−03 | −3.0301E−04 |
| A12 = | −7.3140E−03 | −2.5216E−01 | 9.0069E−05 | 2.4376E−03 | 1.0400E−03 | 1.3317E−04 |
| A14 = | 3.0253E−04 | 6.8179E−02 | −1.5435E−08 | −4.5901E−04 | −5.2316E−05 | −1.7384E−05 |
| A16 = | | −7.0829E−03 | | 3.3211E−05 | 3.4821E−07 | 8.0751E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| \multicolumn{4}{c}{10th Embodiment} | | | |
|---|---|---|---|
| f [mm] | 4.24 | R12/f | 0.30 |
| Fno | 2.18 | f1/f2 | 0.16 |
| HFOV [deg.] | 38.1 | f4/f5 | −0.39 |
| V3 + V5 − V4 | −6.5 | f/f5 | −0.44 |
| T34/T45 | 3.62 | \|f/f1\| + \|f/f2\| | 0.95 |
| CT5/CT6 | 0.54 | \|Pmax\| | 1.13 |
| Td/CT6 | 6.02 | f/EPD | 2.18 |
| ΣCT/Td | 0.72 | SL/TL | 0.94 |
| f/R9 | −0.67 | TL/ImgH | 1.51 |

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image lens assembly comprising six lens elements, the six lens elements being, in order from an object side to an image side:

a first lens element, a second lens element, a third lens element, a fourth lens element, a fifth lens element and a sixth lens element;

wherein the second lens element has positive refractive power; the third lens element with negative refractive power has an image-side surface being concave in a paraxial region thereof; the sixth lens element has an object-side surface being convex in a paraxial region thereof and an image-side surface being concave in a paraxial region thereof, and the image-side surface of the sixth lens element comprises at least one inflection point;

wherein an absolute value of a curvature radius of the image-side surface of the third lens element is smaller than an absolute value of a curvature radius of an object-side surface of the third lens element, an absolute value of a curvature radius of an object-side surface of the fifth lens element is smaller than an absolute value of a curvature radius of an image-side surface of the fourth lens element, the image lens assembly further comprises an aperture stop, an axial distance between the aperture stop and an image plane is SL, an axial distance between an object-side surface of the first lens element and the image plane is TL, a highest absolute value of refractive power of a lens element among the first through sixth lens elements of the image lens assembly is |Pmax|, and the following conditions are satisfied:

$0.75 < SL/TL < 0.90$; and $|Pmax| < 1.5$.

2. The image lens assembly of claim 1, wherein the second lens element has an object-side surface being convex in a paraxial region thereof.

3. The image lens assembly of claim 1, wherein the fourth lens element has an object-side surface being convex in a paraxial region thereof.

4. The image lens assembly of claim 1, wherein a focal length of the image lens assembly is f, an entrance pupil diameter of the image lens assembly is EPD, and the following condition is satisfied:

$$1.4 < f/EPD < 2.6.$$

5. The image lens assembly of claim 1, wherein a curvature radius of the image-side surface of the sixth lens element is R12, a focal length of the image lens assembly is f, and the following condition is satisfied:

$$0.20 < R12/f < 0.40.$$

6. The image lens assembly of claim 1, wherein a sum of central thicknesses from the first through sixth lens elements is ΣCT, an axial distance between the object-side surface of the first lens element and the image-side surface of the sixth lens element is Td, and the following condition is satisfied:

$$0.70 < \Sigma CT/Td < 0.90.$$

7. The image lens assembly of claim 1, wherein the aperture stop is located between the first lens element and the second lens element.

8. An image lens assembly comprising six lens elements, the six lens elements being, in order from an object side to an image side:
  a first lens element, a second lens element, a third lens element, a fourth lens element, a fifth lens element and a sixth lens element;
  wherein the second lens element has positive refractive power; the third lens element with negative refractive power has an object-side surface being convex in a paraxial region thereof and an image-side surface being concave in a paraxial region thereof; the sixth lens element with negative refractive power has an object-side surface being convex in a paraxial region thereof and an image-side surface being concave in a paraxial region thereof, and the image-side surface of the sixth lens element comprises at least one inflection point;
  wherein an absolute value of a curvature radius of an object-side surface of the fifth lens element is smaller than an absolute value of a curvature radius of an image-side surface of the fourth lens element, the image lens assembly further comprises an aperture stop, an axial distance between the aperture stop and an image plane is SL, an axial distance between an object-side surface of the first lens element and the image plane is TL, and the following condition is satisfied:

$$0.75 < SL/TL < 0.90.$$

9. The image lens assembly of claim 8, wherein the first lens element has an image-side surface being concave in a paraxial region thereof, and at least three lens elements among the first through sixth lens elements are made of plastic material.

10. The image lens assembly of claim 8, wherein the fifth lens element has an image-side surface being convex in a paraxial region thereof.

11. The image lens assembly of claim 8, wherein half of a maximal field of view of the image lens assembly is HFOV, and the following condition is satisfied:

$$36 \text{ degrees} < HFOV < 50 \text{ degrees}.$$

12. The image lens assembly of claim 8, wherein a focal length of the image lens assembly is f, a focal length of the first lens element is f1, a focal length of the second lens element is f2, and the following condition is satisfied:

$$|f/f1| + |f/f2| < 1.80.$$

13. The image lens assembly of claim 8, wherein the axial distance between the object-side surface of the first lens element and the image plane is TL, a maximum image height of the image lens assembly is ImgH, an axial distance between the third lens element and the fourth lens element is T34, an axial distance between the fourth lens element and the fifth lens element is T45, and the following conditions are satisfied:

$$TL/ImgH < 1.80; \text{ and}$$

$$0.1 < T34/T45 < 0.8.$$

14. The image lens assembly of claim 8, wherein an axial distance between the third lens element and the fourth lens element is smaller than a central thickness of the third lens element.

15. The image lens assembly of claim 8, wherein a minimum absolute value among absolute values of focal lengths of the first through sixth lens elements of the image lens assembly is the absolute value of the focal length of the second lens element.

16. An image lens assembly comprising six lens elements, the six lens elements being, in order from an object side to an image side:
  a first lens element, a second lens element, a third lens element, a fourth lens element, a fifth lens element and a sixth lens element;
  wherein the first lens element has an image-side surface being concave in a paraxial region thereof; the second lens element has positive refractive power; the third lens element with negative refractive power has an image-side surface being concave in a paraxial region thereof; the sixth lens element has an object-side surface being convex in a paraxial region thereof and an image-side surface being concave in a paraxial region thereof, and the image-side surface of the sixth lens element comprises at least one inflection point;
  wherein an absolute value of a curvature radius of an object-side surface of the fifth lens element is smaller than an absolute value of a curvature radius of an image-side surface of the fifth lens element, the image lens assembly further comprises an aperture stop, an axial distance between the aperture stop and an image plane is SL, an axial distance between an object-side surface of the first lens element and the image plane is TL, and the following condition is satisfied:

$$0.75 < SL/TL < 0.90.$$

17. The image lens assembly of claim 16, wherein the third lens element has an object-side surface being convex in a paraxial region thereof.

18. The image lens assembly of claim 16, wherein the fourth lens element has an object-side surface being convex in a paraxial region thereof.

19. The image lens assembly of claim 16, wherein the fifth lens element has the image-side surface being convex in a paraxial region thereof.

20. The image lens assembly of claim 16, wherein a highest absolute value of refractive power of a lens element among the first through sixth lens elements of the image lens assembly is |Pmax|, and the following condition is satisfied:

$$|Pmax| < 1.5.$$

21. The image lens assembly of claim 16, wherein a focal length of the image lens assembly is f, an entrance pupil diameter of the image lens assembly is EPD, and the following condition is satisfied:

$$1.4 < f/EPD < 2.6.$$

22. The image lens assembly of claim 16, wherein half of a maximal field of view of the image lens assembly is HFOV, and the following condition is satisfied:

$$36 \text{ degrees} < HFOV < 50 \text{ degrees}.$$

23. The image lens assembly of claim 16, wherein a sum of central thicknesses from the first through sixth lens elements is ΣCT, an axial distance between the object-side surface of the first lens element and the image-side surface of the sixth lens element is Td, and the following condition is satisfied:

$$0.70 < \Sigma CT/Td < 0.90.$$

24. The image lens assembly of claim 16, wherein a curvature radius of the image-side surface of the sixth lens element is R12, a focal length of the image lens assembly is f, and the following condition is satisfied:

$$0.20 < R12/f < 0.40.$$

25. The image lens assembly of claim 16, wherein the aperture stop is located between the first lens element and the second lens element.

26. The image lens assembly of claim 16, wherein an axial distance between the fourth lens element and the fifth lens element is greater than an axial distance between the second lens element and the third lens element.

27. The image lens assembly of claim 16, wherein an axial distance between the third lens element and the fourth lens element is smaller than a central thickness of the third lens element.

28. The image lens assembly of claim 16, wherein a minimum absolute value among absolute values of focal lengths of the first through sixth lens elements of the image lens assembly is the absolute value of the focal length of the second lens element.

29. The image lens assembly of claim 16, wherein an absolute value of a curvature radius of the object-side surface of the sixth lens element is smaller than the absolute value of the curvature radius of the image-side surface of the fifth lens element.

30. An image capturing device, comprising:
   the image lens assembly of claim 16; and
   an image sensor, wherein the image sensor is disposed on the image plane of the image lens assembly.

* * * * *